(12) United States Patent
Tzikas et al.

(10) Patent No.: US 6,323,327 B1
(45) Date of Patent: Nov. 27, 2001

(54) REACTIVE DYES, PROCESSES FOR THEIR PREPARATION AND THEIR USE

(75) Inventors: Athanassios Tzikas, Pratteln (CH); Rolf Deitz, Grenzach-Wyhlen; Herbert Klier, Efringen-Kirchen, both of (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/704,354

(22) Filed: Nov. 2, 2000

(30) Foreign Application Priority Data

Nov. 5, 1999 (EP) .................................................. 99811015

(51) Int. Cl.[7] ............................ C09B 62/513; D06P 1/38; C09D 11/02
(52) U.S. Cl. ........................ 534/637; 534/642; 534/648; 8/549; 8/918; 106/31.48; 106/31.51
(58) Field of Search ..................................... 534/637, 642, 534/643; 8/549, 918; 106/31.48, 31.51

(56) References Cited

U.S. PATENT DOCUMENTS

| | | | |
|---|---|---|---|
| 4,885,360 | 12/1989 | Scheibli | 534/642 |
| 5,023,274 | 6/1991 | Püntener et al. | 534/618 |
| 5,292,871 | 3/1994 | Schläfer et al. | 534/642 |
| 5,625,042 | * 4/1997 | Jager et al. | 534/637 |
| 5,801,230 | 9/1998 | Jäger et al. | 534/642 |

FOREIGN PATENT DOCUMENTS

| | | |
|---|---|---|
| 0282443 | 9/1988 | (EP) . |
| 1155149 | 6/1969 | (GB) . |

OTHER PUBLICATIONS

Abstract for EP 0282443 (1988).

* cited by examiner

Primary Examiner—Fiona T. Powers
(74) Attorney, Agent, or Firm—Kevin T. Mansfield

(57) ABSTRACT

Reactive dyes of formula (1)

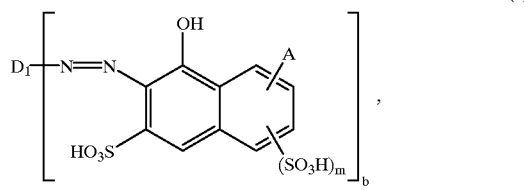

(1)

wherein b is the number 1 or 2,

A is the radical of formula (2) or (3)

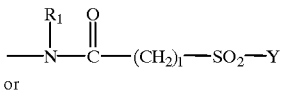

(2)

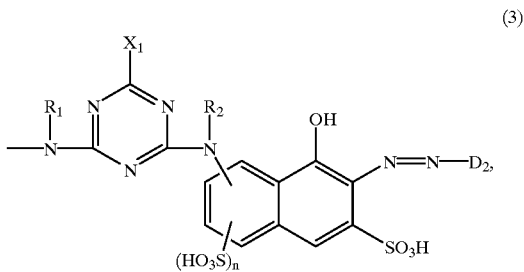

(3)

$D_1$ is a radical off formula

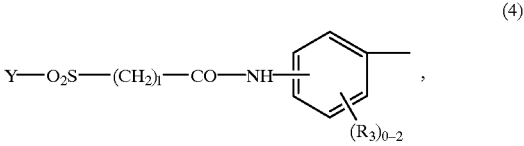

(4)

or the radical of an azo dye when b is the number 1 or the radical of an aromatic tetraazo component when b is the number 2, $D_2$ is the radical of a diazo component, of the benzene or naphthalene series, $R_1$ and $R_2$ are each independently of the other hydrogen or $C_1$–$C_4$alkyl, $(R_3)_{0-2}$ denotes from 0 to 2 substituents selected from the group $C_1$–$C_4$alkyl, $C_1$–$C_4$alkoxy, halogen and sulfo, $X_1$ is fluorine or chlorine, Y is vinyl or a radical —$CH_2$—$CH_2$—U and U is a group removable under alkaline conditions, l is the number 2, 3, 4, 5 or 6, and m and n are each independently of the other the number 0 or 1, wherein when A is a radical of formula (3) and $D_1$ is the radical of an azo dye, at least one of the radicals $D_1$ and $D_2$ contains a fibre-reactive radical of formula (2) with the proviso that A is a radical of formula (2) when $D_1$ is the radical of an aromatic tetraazo component, and A is a radical of formula (3) when $D_1$ is a radical of formula (4), are especially suitable for dyeing cotton and wool and yield dyeings having good all round properties.

15 Claims, No Drawings

REACTIVE DYES, PROCESSES FOR THEIR PREPARATION AND THEIR USE

Reactive dyes, processes for their preparation and their use

The present invention relates to novel reactive dyes, to processes for their preparation and to their use in the dyeing or printing of textile fibre materials.

The practice of dyeing using reactive dyes has recently led to higher demands being made of the quality of the dyeings and the profitability of the dyeing process. As a result, there is still a need for novel reactive dyes having improved properties, especially in respect of their application.

Dyeing nowadays requires reactive dyes that have sufficient substantivity and at the same time have good ease of washing off of unfixed dye. They should also have a good tinctorial yield and high reactivity, the objective being to provide especially dyeings having high degrees of fixing. The known dyes do not satisfy these requirements in all properties.

The problem underlying the present invention is accordingly to find, for the dyeing and printing of fibre materials, novel improved reactive dyes that possess the qualities characterised above to a high degree. The novel dyes should especially be distinguished by high fixing yields and high fibre-dye binding stability; it should also be possible for dye that is not fixed to the fibre to be washed off easily. The dyes should also yield dyeings having good all round properties, for example fastness to light and to wetting.

It has been shown that the problem posed is largely solved by the novel dyes defined below.

The present invention accordingly relates to reactive dyes of formula (1)

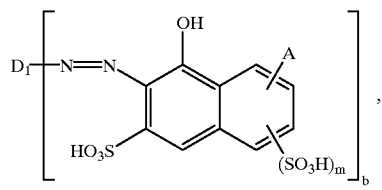

wherein b is the number 1 or 2,

A is a radical of formula (2) or (3)

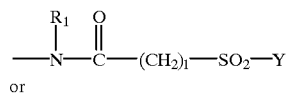

or

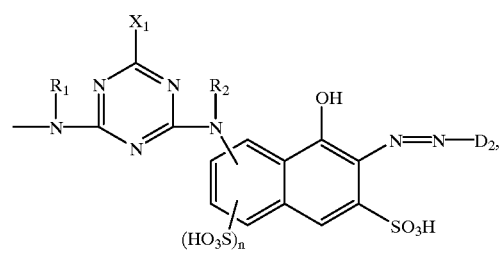

$D_1$ is a radical of formula

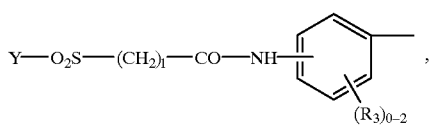

or the radical of an azo dye when b is the number 1 or the radical of an aromatic tetraazo component when b is the number 2, $D_2$ is the radical of a diazo component, of the benzene or naphthalene series, $R_1$ and $R_2$ are each independently of the other hydrogen or $C_1$–$C_4$alkyl, $(R_3)_{0-2}$ denotes from 0 to 2 substituents selected from the group $C_1$–$C_4$alkyl, $C_1$–$C_4$alkoxy, halogen and sulfo, $X_1$ is fluorine or chlorine, Y is vinyl or a radical —$CH_2$—$CH_2$—U and U is a group removable under alkaline conditions, l is the number 2, 3, 4, 5 or 6, and m and n are each independently of the other the number 0 or 1, wherein when A is a radical of formula (3) and $D_1$ is the radical of an azo dye, at least one of the radicals $D_1$ and $D_2$ contains a fibre-reactive radical of formula (2) with the proviso that A is a radical of formula (2) when $D_1$ is the radical of an aromatic tetraazo component, and A is a radical of formula (3) when $D_1$ is a radical of formula (4).

The radicals $R_1$ and $R_2$ in a reactive dye of formula (1) are as alkyl radicals straight-chain or branched. The following radicals may be mentioned by way of example: methyl, ethyl, propyl, isopropyl, butyl, isobutyl, sec-butyl and tert-butyl.

$R_1$ and $R_2$ are preferably hydrogen or methyl and especially hydrogen.

$R_3$ as halogen is, for example, fluorine, chlorine or bromine, preferably chlorine or bromine and especially chlorine.

$R_3$ as $C_1$–$C_4$alkyl is, for example, methyl, ethyl, n- or iso-propyl or n-, sec-, tert- or iso-butyl, preferably methyl or ethyl and especially methyl.

As $C_1$–$C_4$alkoxy for $R_3$ there come into consideration, for example, methoxy, ethoxy, n-propoxy, isopropoxy, n-butoxy and isobutoxy, preferably methoxy and ethoxy and especially methoxy.

$R_3$ preferably denotes one or two sulfo radicals, especially one sulfo radical.

As a group U removable under alkaline conditions there come into consideration, for example, —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl and —$OSO_2$—N($C_1$–$C_4$alkyl)$_2$. U is preferably a group of formula —Cl, —$OSO_3H$, —$SSO_3H$, —OCO—$CH_3$, —OCO—$C_6H_5$ or —$OPO_3H_2$, especially —Cl or —$OSO_3H$.

Examples of suitable radicals Y are accordingly vinyl, β-bromo- or, β-chloro-ethyl, β-acetoxyethyl, β-benzoyloxyethyl, β-phosphatoethyl, β-suffatoethyl and P-thiosulfatoethyl. Y is preferably vinyl, β-chloroethyl or β-sulfatoethyl.

$X_1$ is preferably chlorine.

l preferably denotes the number 3 or 4 and especially 3.

m preferably denotes the number 1.

The reactive dyes of formula (1) according to the invention preferably correspond to a dye of formula (1a)

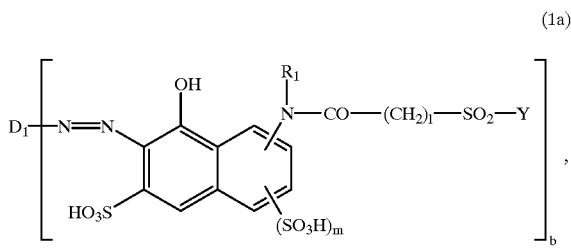

wherein $D_1$ is the radical of an azo dye when b is the number 1 or the radical of an aromatic tetraazo component when b is the number 2, and $R_1$, Y, b, I and m have the definitions and preferred meanings given above.

In a further preferred embodiment, the reactive dyes of formula (1) according to the invention correspond to a dye of formula (1b)

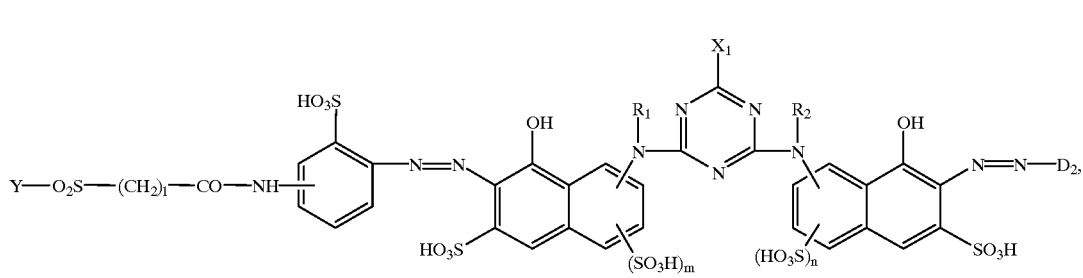

wherein $D_2$, $R_1$, $R_2$, $X_1$, Y, I, m and n have the definitions and preferred meanings given above.

Suitable substituents of $D_1$ as a radical of an azo dye and of $D_2$ include the substituents customary for azo dyes. The following may be mentioned by way of example: $C_1$–$C_4$alkyl, which is to be understood as being methyl, ethyl, no or isopropyl, and n-, iso-, sect or tert-butyl; $C_1$–$C_4$alkoxy, which is to be understood as being methoxy, ethoxy, n or iso-propoxy and n-, iso-, sec- or tert-butoxy; hydroxy-$C_1$–$C_4$alkoxy; phenoxy; $C_2$–$C_6$alkanoylamino unsubstituted or substituted in the alkyl moiety by hydroxy or by $C_1$–$C_4$alkoxy, e.g. acetylamino, hydroxyacetylamino, methoxyacetylamino or propionylamino; benzoylamino unsubstituted or substituted in the phenyl moiety by hydroxy, sulfo, halogen, $C_1$–$C_4$alkyl or by $C_1$–$C_4$alkoxy; $C_1$–$C_6$alkoxycarbonylamino unsubstituted or substituted in the alkyl moiety by hydroxy, $C_1$–$C_4$alkyl or by $C_1$–$C_4$alkoxy; phenoxycarbonylamino unsubstituted or substituted in the phenyl moiety by hydroxy, $C_1$–$C_4$alkyl or by $C_1$–$C_4$alkoxy; amino; N—$C_1$–$C_4$alkyl- or N,N-di-$C_1$–$C_4$alkyl-amino unsubstituted or substituted in the alkyl moiety by hydroxy, $C_1$–$C_4$alkoxy, carboxy, cyano, halogen, sulfo, sulfato, phenyl or by sulfophenyl, e.g. methylamino, ethylamino, N,N-dimethylamino, N,N-diethylamino, β-cyanoethylamino, β-hydroxyethylamino, N,N-di-β-hydroxyethylamino, β-sulfoethylamino, γ-sulfo-n-propylamino, β-sulfatoethylamino, N-ethyl-N-(3-sulfobenzyl)-amino, N-(β-sulfoethyl)-N-benzylamino; cyclohexylamino; N-phenylamino or N—$C_1$–$C_4$alkyl-N-phenylamino unsubstituted or substituted in the phenyl moiety by nitro, $C_1$–$C_4$alkyl, $C_1$–$C_4$alkoxy, carboxy, halogen or by sulfo; $C_1$–$C_4$alkoxycarbonyl, e.g. methoxy- or ethoxy-carbonyl; trifluoromethyl; nitro; cyano; halogen, which is to be understood generally as being, for example, fluorine, bromine or especially chlorine; ureido; hydroxy; carboxy; sulfo; sulfomethyl; carbamoyl; carbamido; sulfamoyl; N-phenylsulfamoyl or N—$C_1$–$C_4$alkyl-N-phenylsulfamoyl unsubstituted or substituted in the phenyl moiety by sulfo or by carboxy; methyl- or ethyl-sulfonyl.

Suitable substituents of $D_1$ as a radical of an azo dye and of $D_2$ also include fibre-reactive radicals.

Fibre-reactive radicals are to be understood as being those which are capable of reacting with the hydroxy groups of the cellulose, with the amino, carboxy, hydroxy and thiol groups in wool and silk or with the amino and possibly carboxy groups of synthetic polyamides to form covalent chemical bonds. The fibre-reactive radicals are generally bonded to the dye radical directly or via a bridge member. Suitable fibre-reactive radicals are, for example, those having at least one removable substituent at an aliphatic, aromatic or heterocyclic radical or those wherein the mentioned radicals contain a radical suitable for reaction with the fibre material, for example a vinyl radical.

A fibre-reactive radical present in $D_1$ as a radical of an azo dye and in $D_2$ preferably corresponds to formula (2a), (5a), (5b), (5c), (5d), (5e) or (5f)

$$-NH-CO-(CH_2)_1-SO_2-Y \qquad (2a),$$

$$-SO_2-Y \qquad (5a),$$

$$-CO-NH-(CH_2)_k-SO_2-Y \qquad (5b),$$

$$-NH-CO-CH(Hal)-CH_2-Hal \qquad (5c),$$

$$-NH-CO-C(Hal)=CH_2 \qquad (5d),$$

(5e)

[structure showing triazine ring with —NR_4, $T_1$, and $X_2$ substituents]

or

-continued

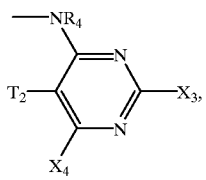
(5f)

wherein
Hal is chlorine or bromine;
$X_2$ is halogen, 3-carboxypyridin-1-yl or 3-carbamoylpyridin-1-yl;
$T_1$ has independently the same definitions as $X_2$, or is a non-fibre-reactive substituent or a fibre-reactive radical of formula (6a), (6b), (6c), (6d), (6e) or (6f)

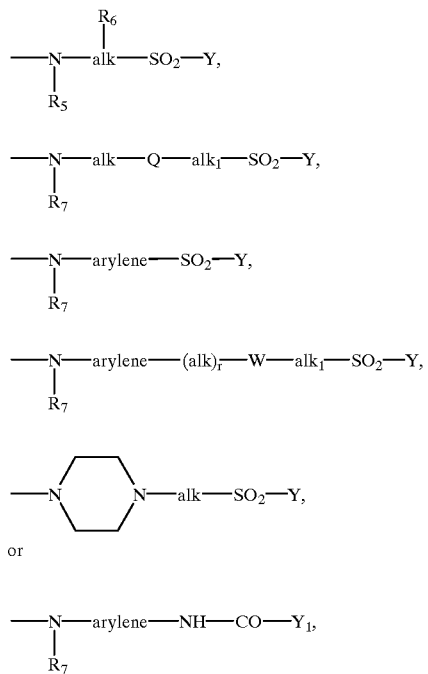

wherein
$R_4$ and $R_7$ each independently of the other have the same definitions and preferred meanings as $R_1$ and $R_2$,
$R_5$ is hydrogen, $C_1$–$C_4$alkyl unsubstituted or substituted by hydroxy, sulfo, sulfato, carboxy or by cyano, or a radical

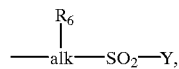

$R_6$ is hydrogen, hydroxy, sulfo, sulfato, carboxy, cyano, halogen, $C_1$–$C_4$alkoxycarbonyl, $C_1$–$C_4$alkanoyloxy, carbamoyl or a group —$SO_2$—Y,
alk and $alk_1$ are each independently of the other linear or branched $C_1$–$C_6$alkylene, arylene is a phenylene or naphthylene radical unsubstituted or substituted by sulfo, carboxy, $C_1$–$C_4$alkyl, $C_1$–$C_4$alkoxy or by halogen, Q is a radical —O— or —$NR_7$— wherein $R_7$ is as defined above,
W is a group —$SO_2$—$NR_5$—, —$CONR_5$— or —$NR_5CO$— wherein $R_5$ is as defined above,
Y has the definitions and preferred meanings given above,
$Y_1$ is a group —CH(Hal)—$CH_2$—Hal or —C(Hal)=$CH_2$ and Hal is chlorine or bromine, and
I has the definitions and preferred meanings given above,
k is the number 2, 3, 4, 5 or 6 and r is the number 0 or 1; and
$X_3$ is halogen or $C_1$–$C_4$alkylsulfonyl;
$X_4$ is halogen or $C_1$–$C_4$alkyl and
$T_2$ is hydrogen, cyano or halogen.
$R_5$ is preferably hydrogen or $C_1$–$C_4$alkyl, such as methyl, ethyl, propyl, isopropyl, butyl, isobutyl, sec-butyl or tert-butyl and especially hydrogen, methyl or ethyl. $R_5$ is especially hydrogen.
$R_6$ is preferably hydrogen.
k is preferably the number 2 or 3 and especially 2.
For a non-fibre-reactive substituent $T_1$ there come into consideration, for example, the following radicals:
hydroxy;
$C_1$–$C_4$alkoxy, for example methoxy, ethoxy, n- or iso-propoxy, n-, sec-, iso- or tert-butoxy, especially methoxy or ethoxy; the mentioned radicals are unsubstituted or substituted in the alky moiety, for example by $C_1$–$C_4$alkoxy, hydroxy, sulfo or by carboxy;
$C_1$–$C_4$alkylthio, for example methylthio, ethylthio, n-, or iso-propylthio or n-butylthio; the mentioned radicals are unsubstituted or substituted in the alkyl moiety, e.g. by $C_1$–$C_4$alkoxy, hydroxy, sulfo or by carboxy;
amino
N-mono- or N,N-di-$C_1$–$C_6$alkylamino, preferably N-mono- or N,N-di-$C_1$–$C_4$alkylamino; the mentioned radicals are unsubstituted, uninterrupted or interrupted in the alkyl moiety by oxygen or substituted in the alky moiety, e.g. by $C_2$–$C_4$alkanoylamino, $C_1$–$C_4$alkoxy, hydroxy, sulfo, sulfato, carboxy, cyano, carbamoyl or by sulfamoly; examples that may be mentioned include N-methylamino, N-ethylamino, N-propylamino, N,N-dimethylamino and N,N-diethylamino, N-β-hydroxyethylamino, N,N-di-β-hydroxyethylamino, N-2-(β-hydroxyethoxy)ethylamino, N-2-[2-(β-hydroxyethoxy)ethoxy]ethylamino, N-β-sulfatoethylamino, N-β-sulfoethylamino, N-carboxymethylamino, N-β-carboxy-ethylamino, N-α,β-dicarboxy-ethylamino, N-α,γ-dicarboxypropylamino and N-β-hydroxyethylamino or N-methyl-N-β-hydroxyethylamino;
$C_5$–$C_7$cycloalkylamino, for example cyclohexylamino, which includes both the unsubstituted radicals and the radicals substituted in the cycloalkyl ring, e.g. by $C_1$–$C_4$alkyl, especially methyl, or by carboxyl;
phenylamino or N—$C_1$–$C_4$alkyl-N-phenylamino, which includes both the unsubdtituted radicals and the radicals substituted in the phenyl ring, e.g. by $C_1$–$C_4$alkyl, $C_1$–$C_4$alkoxy, $C_2C_4$-alkanoylamino, carboxy, carbamoyl, sulfo or by halogen, for example 2-, 3- or 4-chlorophenylamino, 2-, 3- or 4-methylphenylamino, 2-, 3- or 4-methoxyphenylamino, 2-, 3- or 4-sulfophenylamino, disulfophenylamino or 2-, 3- or 4-carboxyphenyl-amino;
naphthylamino unsubstituted or substituted in the naphthyl ring, e.g. by sulfo, preferably the radicals substituted by from 1 to 3 sulfo groups, for example 1 - or 2naphthylamino, 1-sulfo 2-naphthylamino, 1,5-disulfo-2-naphthylamino or 4,8-disulfo-2-naphthylamino; or benzylamino unsubstituted or substituted in the phenyl moiety, e.g. by $C_1$–$C_4$alkyl, $C_1$–$C_4$alkoxy, carboxy, sulfo or by halogen.

As a non-fibre-reactive radical, $T_1$ is preferably $C_1$–$C_4$alkoxy, $C_1$–$C_4$alkylthio, hydroxy, amino, N-mono- or N,N-di-$C_1$–$C_4$alkylamino unsubstituted or substituted in the alkyl moiety by hydroxy, sulfato or by sulfo, morpholino, or phenylamino or N—$C_1$–$C_4$alkyl-N-phenylamino (wherein the alkyl is unsubstituted or substituted by hydroxy, sulfo or by sulfato) each unsubstituted or substituted in the phenyl ring by sulfo, carboxy, acetylamino, chlorine, methyl or by methoxy, or naphthylamino unsubstituted or substituted by from 1 to 3 sulfo groups.

Especially preferred nonfibre-reactive radicals $T_1$ are amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, morpholino, 2-, 3- or 4-carboxyphenylamino, 2-, 3- or 4-sulfophenylamino or N—$C_1$–$C_4$alkyl-N-phenylamino.

$X_2$ is preferably halogen, for example fluorine, chlorine or bromine and especially chlorine or fluorine.

$T_2$, $X_3$ and $X_4$ as halogen are, for example, fluorine, chlorine or bromine, especially chlorine or fluorine.

$X_3$ as $C_1$–$C_4$alkylsulfonyl is, for example, ethylsulfonyl or methylsulfonyl and especially methylsulfonyl.

$X_4$ as $C_1$–$C_4$alkyl is, for example, methyl, ethyl, n- or iso-propyl, n-, iso- or tert-butyl and especially methyl.

$X_3$ and $X_4$ are preferably each independently of the other chlorine or fluorine.

$T_2$ is preferably cyano or chlorine.

Hal is preferably bromine.

alk and $alk_1$ are each independently of the other, for example, a methylene, ethylene, 1,3-propylene, 1,4-butylene, 1,5-pentylene or 1,6-hexylene radical or a branched isomer thereof. alk and $alk_1$ are preferably each independently of the other a $C_1$–$C_4$alkylene radical and especially an ethylene radical or propylene radical.

arylene is preferably a 1,3- or 1,4-phenylene radical unsubstituted or substituted, for example, by sulfo, methyl, methoxy or by carboxy, and especially an unsubstituted 1,3- or 1,4-phenylene radical.

Q is preferably —NH— or —O— and especially —O—.

W is preferably a group of formula —CONH— or —NHCO—, especially a group of formula —CONH—.

r is preferably the number 0.

The reactive radicals of formulae (6a) to (6f) are preferably those wherein W is a group of formula —CONH—, $R_5$, $R_6$ and $R_7$ are each hydrogen, Q is a radical —O— or —NH—, alk and $alk_1$ are each independently of the other ethylene or propylene, aryiene is phenylene unsubstituted or substituted by methyl, methoxy, carboxy or by sulfo, Y is vinyl or β-sulfatoethyl, $Y_1$ is —CHBr—$CH_2$Br or —CBr=$CH_2$ and r is the number 0.

A fibre-reactive radical present in $D_1$ as the radical of an azo dye and in $D_2$ corresponds especially to formula (2a), (5a), (5b), (5c), (5d) or (5e) wherein Y is vinyl, β-chloroethyl or β-sulfatoethyl, Hal is bromine, $R_4$ is hydrogen, l is the number 3 or 4, k is the number 2 or 3, X2 is chlorine or fluorine, $T_1$ is $C_1$–$C_4$alkoxy, $C_1$–$C_4$alkylthio, hydroxy, amino, N-mono- or N,N-di-$C_1$–$C_4$alkylamino unsubstituted or substituted in the alkyl moiety by hydroxy, sulfato or by sulfo, morpholino, or phenylamino or N—$C_1$–$C_4$alkyl-N-phenylamino (wherein the alkyl is unsubstituted or substituted by hydroxy, sulfo or by sulfato) each unsubstituted or substituted in the phenyl ring by sulfo, carboxy, acetylamino, chlorine, methyl or by methoxy, or naphthylamino unsubstituted or substituted by from 1 to 3 sulfo groups, or is a fibre-reactive radical of formula (6a'), (6b'), (6c'), (6d') or (6f')

  (6a'),

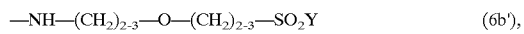  (6b'),

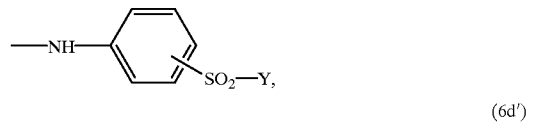  (6c'),

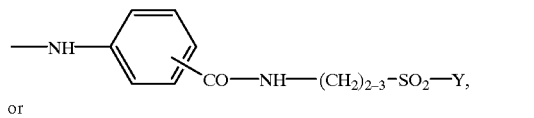  (6d')

or

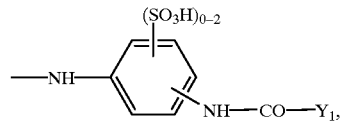  (6f')

especially (6c') or (6d'), wherein

Y is as defined above, and $Y_1$ is a group —CH(Br)—$CH_2$—Br or —C(Br)=$CH_2$.

In the case of the radicals of formulae (6a') and (6b'), Y is preferably β-chloroethyl. In the case of the radicals of formulae (6c') and (6d'), Y is preferably vinyl or β-sulfatoethyl.

$D_1$ as the radical of an azo dye preferably corresponds to formula

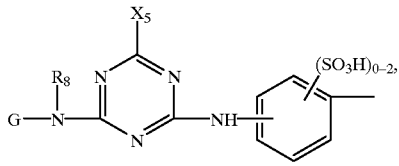  (7)

wherein $R_8$ is hydrogen or $C_1$–$C_4$alkyl, $X_5$ is fluorine or chlorine, and G is a monoazo or disazo radical of formula (8) or (9)

  (8) or

  (9), wherein

D is the radical of a diazo component, of the benzene or naphthalene series,

M is the radical of a central component, of the benzene or naphthalene series,

K is the radical of a coupling component, of the benzene, naphthalene, pyrazolone, 6-hydroxypyrid-2-one or acetoacetic acid arylamide series, and u is a number 0 or 1, wherein D, M and K may carry substituents customary for azo dyes.

The expression "substituents customary for azo dyes" is intended to include both fibre-reactive and non-fibrereactive substituents, for example the substituents mentioned above for $D_1$ and $D_2$.

As non-fibre-reactive substituents for D, M and K in G there come into consideration especially $C_1$–$C_4$alkyl or $C_1$–$C_4$alkoxy unsubstituted or further substituted by hydroxy, sulfo or by suffato, halogen, carboxy, sulfo, nitro, cyano, trifluoromethyl, sulfamoyl, carbamoyl, amino, ureido, hydroxy, sulfomethyl, $C_2$–$C_4$alkanoylamino, benzoylamino unsubstituted or substituted in the phenyl ring by $C_1$–$C_4$alkyl, $C_1$–$C_4$alkoxy, halogen or by sulfo, or phenyl unsubstituted or substituted by $C_1$–$C_4$alkyl, $C_1$–$C_4$alkoxy, halogen, carboxy or by sulfo.

The monoazo or disazo radicals of formula (8) or (9) preferably contain at least one sulfo group.

Preferred monoazo or disazo radicals G are the radicals of formulae (10a), (10b), (10c), (10d), (10e), (10f), (10g), (10h), (10i), (10j), (10k), (10l), (10m), (10n), (10o) and (10p)

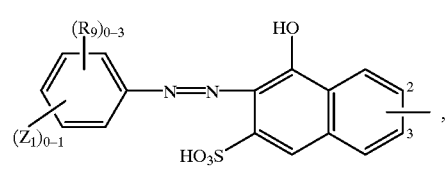
(10a)

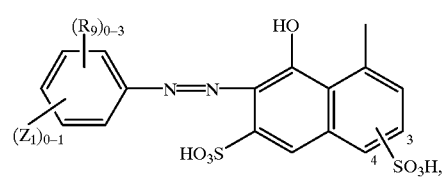
(10b)

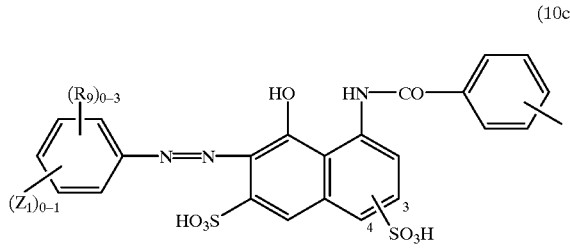
(10c)

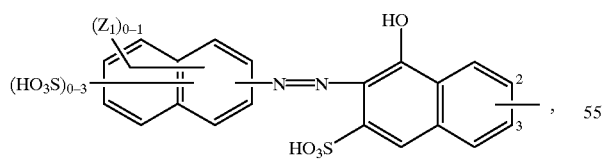
(10d)

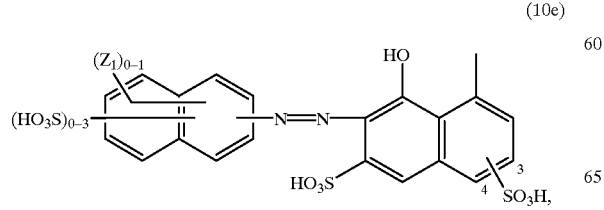
(10e)

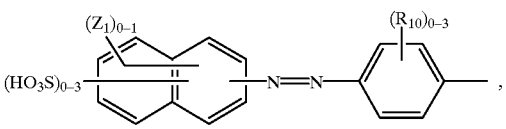
(10f)

wherein $(R_9)_{0-3}$ denotes from 0 to 3 identical or different substituents from the group $C_1$–$C_4$alkyl, $C_1$–$C_4$alkoxy, halogen, carboxy and sulfo, $(R_{10})_{0-3}$ denotes from 0 to 3 identical or different substituents from the group halogen, nitro, cyano, trifluoromethyl, sulfamoyl, carbamoyl, $C_1$–$C_4$alkyl, $C_1$–$C_4$alkoxy unsubstituted or substituted by hydroxy, sulfato or by $C_1$–$C_4$alkoxy, amino, $C_2$–$C_4$alkanoylamino, ureido, hydroxy, carboxy, sulfomethyl, $C_1$–$C_4$alkylsulfonylamino and sulfo, preferably from 0 to 2 identical or different substituents from the group $C_1$–$C_4$alkyl, $C_1$–$C_4$alkoxy, $C_2$–$C_4$alkanoylamino, ureido, sulfo and $C_1$–$C_4$alkoxy unsubstituted or substituted in the alkyl moiety by hydroxy or by sulfato, and $Z_1$, where present, is a radical of formula (2a), (5a), (5b), (5c), (5d) or (5e), preferably (2a), (5a) or (5b) and especially (5a), the mentioned radicals having the definitions and preferred meanings given above,

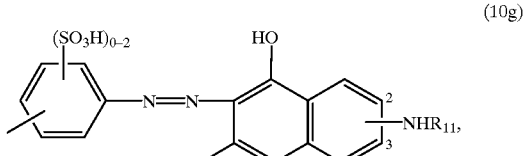
(10g)

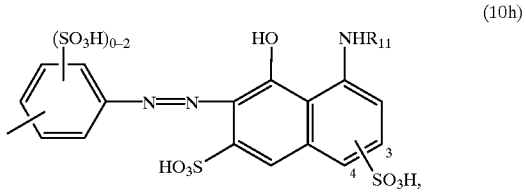
(10h)

wherein $R_{11}$ is $C_2$–$C_4$alkanoyl or benzoyl

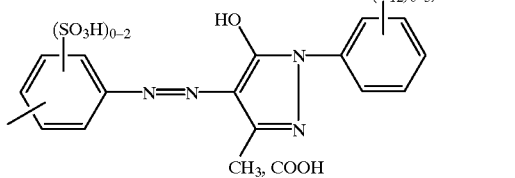
(10i)

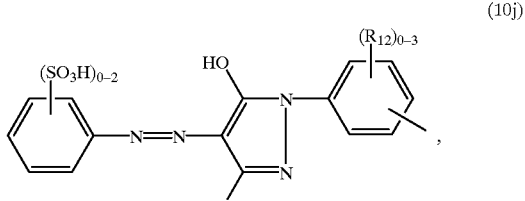
(10j)

wherein $(R_{12})_{0-3}$ denotes from 0 to 3 identical or different substituents from the group $C_1$–$C_4$alkyl, $C_1$–$C_4$alkoxy, halogen, carboxy and sulfo,

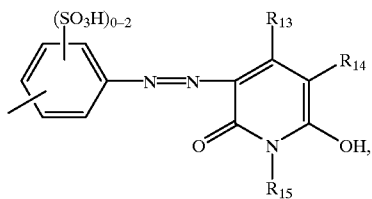

(10k)

wherein $R_{13}$ and $R_{15}$ are each independently of the other hydrogen, $C_1$–$C_4$alkyl or phenyl, and $R_{14}$ is hydrogen, cyano, carbamoyl or sulfomethyl,

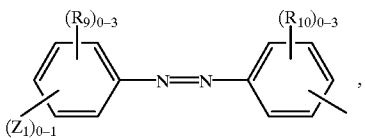

(10l)

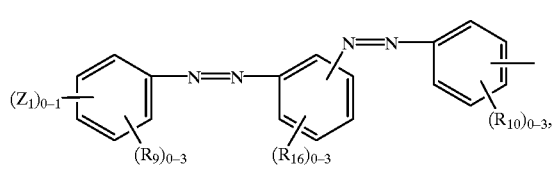

(10m)

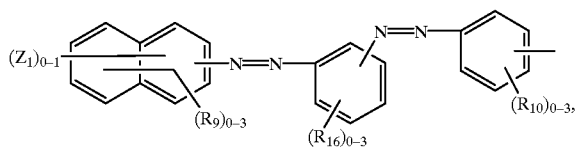

(10n)

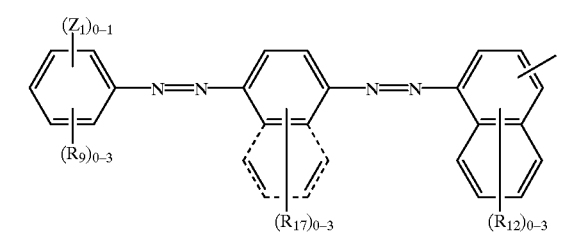

or

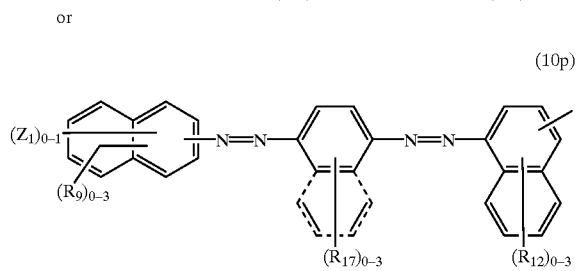

(10p)

wherein $(R_9)_{0-3}$, $(R_{10})_{0-3}$ and $(R_{12})_{0-3}$ are each as defined above, $(R_{16})_{0-3}$ and $(R_{17})_{0-3}$ each independently of the other denote from 0 to 3 identical or different substituents from the group $C_1$–$C_4$alkyl, $C_1$–$C_4$alkoxy, halogen, carboxy and sulfo, and $Z_1$ has the definitions and preferred meanings given above.

As $C_1$–$C_4$alkyl for $R_8$, $R_9$, $R_{10}$, $R_{12}$, $R_{13}$, $R_{15}$, $R_{16}$ and $R_{17}$, each independently of the others, there come into consideration e.g. methyl, ethyl, n-propyl, isopropyl, n-butyl, sec-butyl, tertbutyl and isobutyl, preferably methyl and ethyl. As $C_1$–$C_4$alkyl, $R_8$ is especially methyl and $R_{15}$ is especially ethyl.

As $C_1$–$C_4$alkoxy for $R_9$, $R_{10}$, $R_{12}$, $R_{16}$ and $R_{17}$, each independently of the others, there come into consideration e.g. methoxy, ethoxy, n-propoxy, isopropoxy, n-butoxy and isobutoxy, preferably methoxy and ethoxy and especially methoxy. $R_{10}$ is unsubstituted or substituted in the alkyl moiety by hydroxy or by sulfato.

As halogen for $R_9$, $R_{10}$, $R_{12}$, $R_{16}$ and $R_{17}$, each independently of the other, there come into consideration e.g. fluorine, chlorine and bromine, preferably chlorine and bromine and especially chlorine.

As $C_2$–$C_4$alkanoylamino for $R_{10}$ there come into consideration e.g. acetylamino and propionylamino, especially acetylamino.

$R_{11}$ is e.g. acetyl or propionyl.

$(R_9)_{0-3}$ in the disazo radicals of formulae (10n) and (10p) preferably denotes from 0 to 3 sulfo groups.

The numbers on the naphthyl rings of the radicals of formulae (10a), (10b), (10c), (10d), (10e), (10g) and (10h) indicate the possible bonding positions.

Especially preferred monoazo or disazo radicals G are the radicals of formulae (10a), (10b), (10d), (10e), (10f), (10k) and (10m), especially (10a), (10b), (10d) and (10e).

$R_8$ is preferably hydrogen or methyl and especially hydrogen.

$X_5$ is preferably chlorine.

$D_1$ as the radical of an azo dye of formula (7) preferably corresponds to formula (7a)

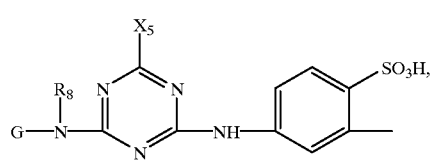

(7a)

wherein $X_5$, $R_8$ and G have the definitions and preferred meanings given above.

In a further preferred embodiment of the present invention, $D_1$ as the radical of an azo dye corresponds to a monoazo radical of formula (11) or (12)

$$D^*\text{—}N\text{=}N\text{—}K^{**}\text{—} \quad (11)$$

$$\text{—}D^*\text{—}N\text{=}N\text{—}K^* \quad (12),$$

preferably of formula (11), wherein $D^*$ is the radical of a diazo component, of the benzene or naphthalene series, $K^*$ is the radical of a coupling component, of the benzene, naphthalene, pyrazolone, 6-hydroxypyrid-2-one or acetoacetic acid arylamide series, and $K^{**}$ is the radical of a coupling component, of the benzene, naphthalene or pyrazolone series, wherein $D^*$, $K^*$ and $K^{**}$ may carry substituents customary for azo dyes.

As non-fibre-reactive substituents for $D^*$, $K^*$ and $K^{**}$ there come into consideration preferably $C_1$–$C_4$alkyl or $C_1$–$C_4$alkoxy unsubstituted or further substituted by hydroxy, $C_1$–$C_4$alkoxy, sulfo or by sulfato, halogen, carboxy, sulfo, nitro, cyano, trifluoromethyl, sulfamoyl, carbamoyl, amino, ureido, hydroxy, sulfomethyl, $C_2$–$C_4$alkanoylamino, $C_1$–$C_4$alkylsulfonylamino, benzoylamino unsubstituted or substituted in the phenyl ring by $C_1$–$C_4$alkyl, $C_1$–$C_4$-alkoxy, halogen or by sulfo, or phenyl unsubstituted or substituted by $C_1$–$C_4$alkyl, $C_1$–$C_4$-alkoxy, halogen, carboxy or by sulfo.

As fibre-reactive substituents for D*, K* and K** there come into consideration preferably the radicals of formulae (2a), (5a), (5b), (5c), (5d) and (5e), preferably (2a), (5a) and (5b) and especially (5a), the mentioned radicals having the definitions and preferred meanings given above.

The monoazo radicals of formula (11) or (12) preferably contain at least one suffo group.

Preferred monoazo radicals $D_1$ of formula (11) correspond to the radicals of the abovementioned formulae (10a), (10b), (10d), (10e), (10f) and (10I) or to the radicals of formulae (11a), (11b), (11c), (11d), (11e) and (11f)

In a preferred embodiment of the dyes according to the invention, $D_1$ as the radical of an azo dye is a radical of formula (7) wherein $X_5$ is fluorine or chlorine, especially chlorine, $R_8$ is hydrogen or $C_1$–$C_4$alkyl, preferably hydrogen or methyl and especially hydrogen, and G is a monoazo radical of the above-mentioned formula (10a), (10b), (10d) or (10e), especially (10a) or (10b), or $D_1$ as the radical of an azo dye is a radical of the above-mentioned formula (10a), (10b), (10l), (11a), (11b) or (11f), especially (10l) or (11b), wherein the substituents $(R_9)_{0-3}$, $(R_{10})_{0-3}$ and $Z_1$ have the definitions and preferred meanings given above.

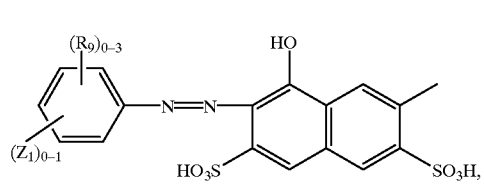
(11a)

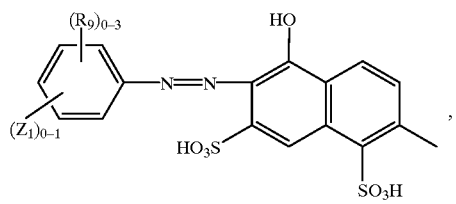
(11b)

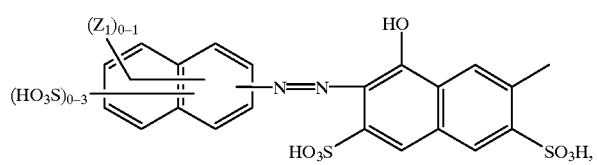
(11c)

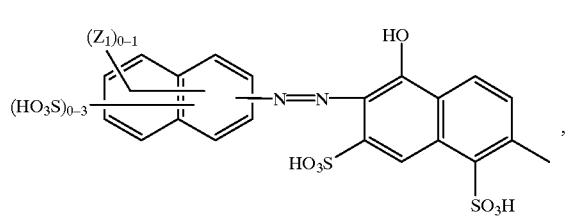
(11d)

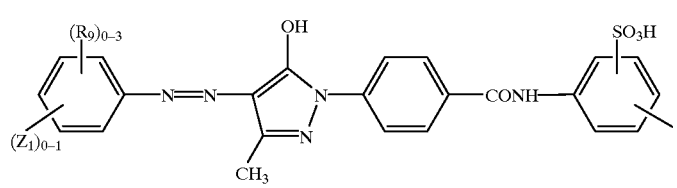
(11e)

or

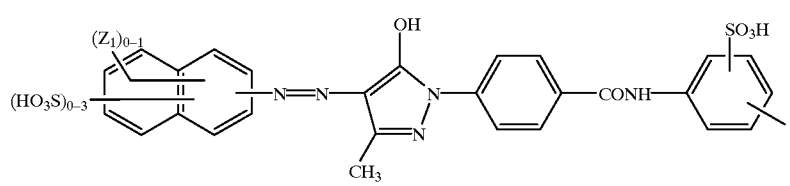
(11f)

wherein $(R_9)_{0-3}$ and $Z_1$ have the definitions and preferred meanings given above.

Especially preferred monoazo radicals $D_1$ are the radicals of formulae (10a), (10b), (10I), (11a), (11b) and (11f), especially (10I) and (11b).

As an aromatic tetraazo component, $D_1$ is, for example, phenylene or naphthylene unsubstituted or substituted by $C_1$–$C_4$alkyl, $C_1$–$C_4$alkoxy, $C_2$–$C_4$alkanoylamino, sulfo, halogen or by carboxy, or a radical of formula (13)

(13)

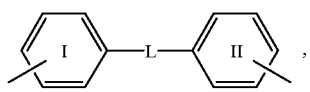

wherein benzene rings I and II are unsubstituted or substituted by $C_1$–$C_4$alkyl, $C_1$–$C_4$alkoxy, $C_2$–$C_4$alkanoylamino, sulfo, halogen or by carboxy and L is a direct bond or a $C_1$–$C_{10}$alkylene radical which may be interrupted by 1, 2 or 3 oxygen atoms, or L is a bridge member of formula

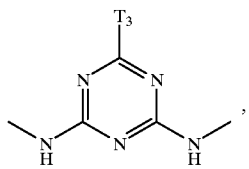

—CH=CH—, —N=N—, —NH—, —CO—, —NH—CO—, —NH—SO$_2$—, —NH—CO—NH—, —O—, —S— or —SO$_2$— and $T_3$ is halogen, e.g. chlorine or fluorine, preferably chlorine, or has the definitions and preferred meanings given above for $T_1$ as a non-fibre-reactive substituent.

L as a $C_1$–$C_{10}$alkylene radical, preferably a $C_2$–$C_6$alkylene radical, is straight-chain or branched or is a $C_5$–$C_6$cycloalkylene radical and preferably not interrupted by oxygen atoms. L as a $C_1$–$C_{10}$alkylene radical is especially a $C_2$–$C_4$alkylene radical.

As an aromatic tetraazo component there also comes into consideration for $D_1$ a radical of formula (14)

(14)

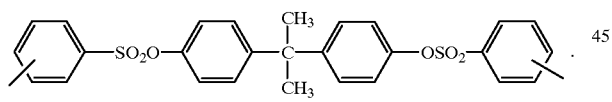

$D_1$ as an aromatic tetraazo component is preferably a naphthylene substituted by from 1 to 3, preferably 2, sulfo groups, a radical of formula (13) wherein benzene rings I and II are unsubstituted or substituted by 1 or 2 substituents from the group sulfo, carboxy, methyl and methoxy and L is a direct bond, a $C_2$–$C_4$alkylene radical or a bridge member of formula —CH=CH—, —N=N—, —NH—, —CO—, —NH—CO—, —NH—SO$_2$-, —NH—CO—NH—, —O—, —S— or —SO$_2$—, especially a direct bond, a $C_2$–$C_4$alkylene radical or a bridge member of formula —CH=CH—, —N=N— or —NH—CO—; or $D_1$ is a radical of formula (14).

$D_2$ is, for example, phenyl or naphthyl unsubstituted or substituted by the fibre-reactive and non-fibre-reactive substituents mentioned above.

$D_2$ is preferably a radical of formula (15)

(15)

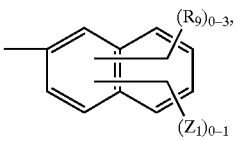

wherein
$R_9$ and $Z_1$ have the definitions and preferred meanings given above.

$D_2$ is especially a radical of formula (15a), (15b), (15c), (15d) or (15e)

(15a)

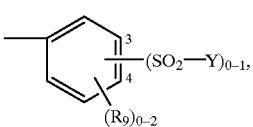

(15b)

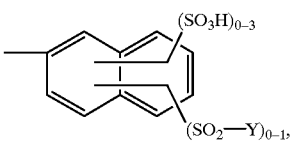

(15c)

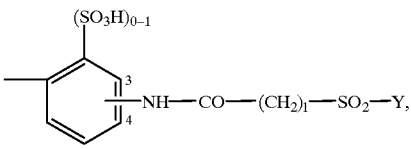

(15d)

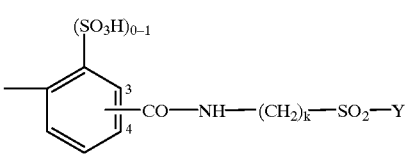

or (15e)

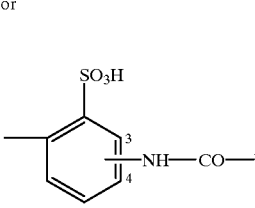

wherein $(R_9)_{0-2}$ denotes from 0 to 2 identical or different substituents selected from the group halogen, $C_1$–$C_4$alkyl, $C_1$–$C_4$alkoxy and sulfo, especially methyl, methoxy and sulfo, p1 $Y_1$ is a group —CH(Br)—CH$_2$—Br or —C(Br)=CH$_2$, Y is vinyl, β-chloroethyl or β-sulfatoethyl,
k is the number 2 or 3, especially 2, and
l is the number 3 or 4, especially 3.

The numbers in the radicals of formulae (15a), (15c), (15d) and (15e) indicate possible bonding positions for the fibre-reactive radical.

$D_2$ is very especially a radical of formula (15a), (15b), (15c) or (15d), especially (15a) or (15b), the radicals of formulae (15a) and (15b) preferably each containing a fibre-reactive radical.

A radical of formula (15a) is a very important meaning of $D_2$, the radical of formula (15a) preferably containing a fibre-reactive radical.

The present invention relates also to a process for the preparation of the reactive dyes according to the invention, in which process (i) approximately one molar equivalent of a diazotised amine of formula (16)

    (16)

is coupled to approximately one molar equivalent of a compound of formula (17)

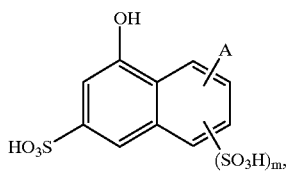    (17)

or (ii) approximately one molar equivalent of a tetraazotised diamine of formula (18)

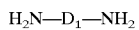    (18)

is coupled to approximately two molar equivalents of a compound of formula (17), A, $D_1$ and m having the definitions and preferred meanings given above.

In the case of reaction (i), a reactive dye of formula (1) wherein b is the number 1 is iobtained.

In the case of reaction (ii), a reactive dye of formula (1) wherein b is the number 2 is obtained. It may also be possible to use a mixture of two different compounds of formula (17), for example a 1:1 mixture, which differ from one another in the number m, the position of the radical A or the position of the suffo group.

The diazoffsation of the amines of formula (16) or the tetraazotisation of the diamines of formula (18) is carried out, for example, with a nitrite, e.g. with an alkali metal nitrite, such as sodium nitrite, in an acidic medium, e.g. in a hydrochloric-acid-containing medium, at temperatures of, for example, from –5 to 40° C. and preferably from –5 to 25° C.

The coupling to the coupling component of formula (17) is effected in a manner known per se at acidic or neutral to weakly alkaline pH values, for example at a pH value of from 1 to 10, and at temperatures of, for example, from –5 to 60° C., preferably from 0 to 30° C.

Compounds of formula (16) wherein $D_1$ is a radical of formula (4) and the compounds of formula (17) wherein A is a radical of formula (2) are described, for example, in GB-A-1 155 149.

The compound of formula (17) wherein A is a radical of formula (3) can be prepared, for example, by condensing approximately one molar equivalent of a compound of formula (19)

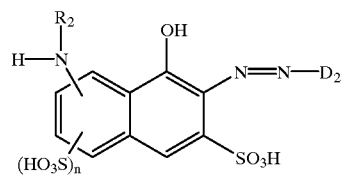    (19)

and approximately one molar equivalent of a compound of formula (20)

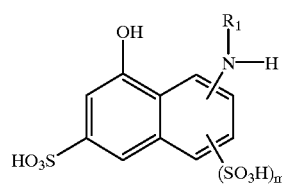    (20)

with approximately one molar equivalent of a compound of formula (21)

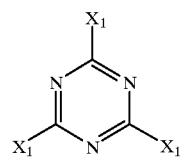    (21)

stepwise in any order, $D_2$, $R_1$, $R_2$, $X_1$, m and n each being as defined above.

The condensation reactions between the compounds of formulae (19), (20) and (21) are generally carried out analogously to known processes, generally in aqueous solution at temperatures of, for example, from 0 to 50° C. and a pH value of, for example, from 4 to 10.

Preferably, in a first condensation step a compound of formula (19) is reacted with a compound of formula (21) and then, in a second condensation step, the resulting intermediate is reacted with a compound of formula (20). Instead of the compound of formula (19) it is also possible to use in the process the corresponding precursor of formula (22)

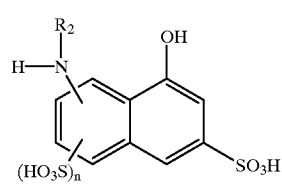    (22)

and to introduce the radical $D_2$ only after the first condensation step by means of a corresponding diazotisation and coupling reaction. The most important process variants are described in the Examples.

The compounds of formulae (16), (18), (19), (20), (21) and (22) are known or can be obtained in a manner known per so.

The reactive dyes according to the invention are suitable for dyeing and printing a wide variety of materials, especially hydroxyl-group-containing or nitrogen-containing fibre materials and also paper and leather. Examples include silk, wool, polyamide fibres and polyurethanes, and especially all types of cellulosic fibre materials. Such fibre materials are, for example, natural cellulose fibres, such as cotton, linen and hemp, and cellulose and regenerated cellulose. The dyes according to the invention are also suitable for dyeing or printing hydroxyl-group-containing fibres present in blend fabrics, for example blends of cotton and polyester fibres or polyamide fibres.

The present invention relates also to the use of compounds of formula (1) in the dyeing or printing of hydroxyl-group-containing or nitrogen-containing, especially cotton-containing, fibre materials.

The reactive dyes according to the invention can be applied to the fibre material and fixed to the fibre in a variety of ways, especially in the form of an aqueous dye solution or dye print paste. They are suitable both for the exhaust process and for dyeing in accordance with the pad-dyeing process; they can be used at low dyeing temperatures and require only short steaming times in the pad-steam process. The degrees of fixing are high and unfixed dye can be washed off readily, the difference between the degree of exhaust and the degree of fixing being remarkably small, that is to say the soaping loss is very small. The reactive dyes according to the invention are also suitable for printing, especially on cotton, and also for printing nitrogen-containing fibres, for example wool or silk or blend fabrics that contain wool.

The dyeings and prints produced using the reactive dyes according to the invention have a high tinctorial strength, a high colour brilliance and a high fibre-dye binding stability in both the acidic and the alkaline range. Special mention should be made of their good fastness to light and their good wet-fastness properties, such as fastness to washing, to water, to sea-water, to cross-dyeing and to perspiration. The dyeings obtained exhibit fibre levelness and surface levelness.

The present invention relates also to aqueous inks comprising a reactive dye of formula (1), A, $D_1$, b and m having the definitions and preferred meanings given above.

The dyes used in the inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be desalted, for example, by membrane separation procedures, such as ultrafiltration, reverse osmosis or dialysis.

The inks preferably have a total content of dyes of from 1 to 35% by weight, especially from 1 to 30% by weight and preferably from 1 to 20% by weight, based on the total weight of the ink. As a lower limit, a limit of 1.5% by weight, preferably 2% by weight and especially 3% by weight, is preferred.

The inks may comprise water-miscible organic solvents, for example $C_1$–$C_4$ alcohols, such as methanol, ethanol, n-propanol, isopropanol, n-butanol, sec-butanol, tert-butanol and iso-butanol; amides, e.g. dimethylformamide and dimethylacetamide; ketones or ketone alcohols, e.g. acetone and diacetone alcohol; ethers, e.g. tetrahydrofuran and dioxane; nitrogen-containing heterocyclic compounds, e.g. N-methyl-2-pyrrolidone and 1,3-dimethyl-2-imidazolidone; polyalkylene glycols, e.g. polyethylene glycol and polypropylene glycol; $C_2$–$C_6$ alkylene glycols and thioglycols, e.g. ethylene glycol, propylene glycol, butylene glycol, triethylene glycol, thiodiglycol, hexylene glycol and diethylene glycol; further polyols, e.g. glycerol and 1,2,6-hexanetriol; and $C_1$–$C_4$ alkyl ethers of polyhydric alcohols, e.g. 2-methoxyethanol, 2-(2-methoxyethoxy)ethanol, 2-(2-ethoxyethoxy)ethanol, 2-[2-(2-methoxyethoxy)ethoxy]-ethanol and 2-[2-(2-ethoxyethoxy)ethoxy]ethanol; preferably N-methyl-2-pyrrolidone, diethylene glycol, glycerol or especially 1,2-propylene glycol, usually in an amount of from 2 to 30% by weight, especially from 5 to 30% by weight and preferably from 10 to 25% by weight, based on the total weight of the ink.

The inks may also comprise solubilisers, e.g. ε-caprolactam.

The inks may comprise thickeners of natural or synthetic origin inter alia for the purpose of adjusting the viscosity.

Examples of thickeners that may be mentioned include commercially available alginate thickeners, starch ethers or locust bean flour ethers, especially sodium alginate on its own or in admixture with modified cellulose, e.g. methylcellulose, ethylcellulose, carboxymethy-cellulose, hydroxyethylcellulose, methylhydroxyethylcellulose, hydroxypropyl cellulose or hydroxypropyl methylcellulose, especially with preferably from 20 to 25% by weight carboxymethylcellulose. Synthetic thickeners that may be mentioned are, for example, those based on poly(meth)acrylic acids or poly(meth)acrylamides.

The inks comprise such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, polyphosphates or citrates. Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

As further additives, the inks may comprise surfactants or humectants.

Suitable surfactants include commercially available anionic or non-ionic surfactants. As humectants in the inks according to the invention there come into consideration, for example, urea or a mixture of sodium lactate (advantageously in the form of a 50% to 60% aqueous solution) and glycerol and/or propylene glycol in amounts of preferably from 0.1 to 30% by weight, especially from 2 to 30% by weight.

Preference is given to inks having a viscosity of from 1 to 40 mpas, especially from 1 to 20 mPa·s and preferably from 1 to 10 mPa·s.

The inks may also comprise customary additives, such as antifoam agents or especially substances that inhibit the growth of fungi and/or bacteria. Such additives are usually used in amounts of from 0.01 to 1% by weight, based on the total weight of the ink.

The inks can be prepared in customary manner by mixing the individual constituents together in the desired amount of water.

The inks according to the invention are especially suitable for use in recording systems of the type in which an ink is expressed in the form of droplets from a small aperture, the droplets being directed onto a substrate on which an image is produced. Suitable substrates are, for example, paper, textile fibre materials or plastics films. Suitable recording systems are, for example, commercially available inkjet printers for use in paper or textile printing, or writing implements, such as fountain pens or ballpoint pens, especially inkjet printers.

Depending upon the nature of the use it may be necessary, for example, to adjust as necessary the viscosity or other physical properties of the ink, especially those properties which have an effect upon the affinity for the substrate in question.

Examples of paper that can be printed using the inks according to the invention include commercially available inkjet paper, photographic paper, glossy paper and plastics-coated paper, e.g. Epson inkjet paper, Epson photo paper, Epson glossy paper, Epson glossy film, HP special inkjet paper, Encad photo gloss paper and Ilford photo paper. Plastics films that can be printed using the inks according to the invention are, for example, transparent or milky/opaque. Suitable plastics films are, for example, 3M transparency film.

Textile fibre materials that come into consideration are, for example, nitrogen-containing or hydroxy-group-containing fibre materials, e.g. textile fibre materials of cellulose, silk, wool or synthetic polyamides, preferably cellulose.

The present invention accordingly also relates to a method of printing textile fibre materials, paper or plastics films, especially textile fibre materials or paper, more especially textile fibre materials, in accordance with the inkjet printing method, which comprises using an aqueous ink comprising a reactive dye of formula (1), wherein A, $D_1$, b and m have the definitions and preferred meanings given above.

In inkjet printing, individual droplets of the ink are sprayed onto a substrate in a controlled manner from a nozzle. For this purpose, predominantly the continuous inkjet method and the drop-on-demand method are used. In the continuous inkjet method, the droplets are produced continuously and any droplets not required for the printing are conveyed to a collecting vessel and recycled, whereas in the drop-on-demand method droplets are produced and printed as required; that is to say droplets are produced only when required for the printing. The production of the droplets can be effected, for example, by means of a piezo-inkjet head or by means of thermal energy (bubble jet). For the process according to the invention, printing by means of a piezo-inkjet head is preferred. Also preferred for the process according to the invention is printing in accordance with the continuous inkjet method.

The recordings, for example prints, produced are distinguished especially by a high tinctorial strength and a high colour brilliance as well as by good light-fastness and wet-fastness properties.

The following Examples serve to illustrate the invention. Unless otherwise indicated, the temperatures are given in degrees Celsius, parts are parts by weight and percentages relate to percent by weight. Parts by weight relate to parts by volume in a ratio of kilograms to litres.

EXAMPLE 1

25.6 parts of 1,3phenylenediamine-4-sulfonic acid are dissolved neutrally in 200 parts of water, and 4.6 parts of sodium acetate are added. At 10° C. with vigorous stirring, 31 parts of γ-(β-chloroethylsulfonyl)butyryl chloride are added to the resulting solution, the pH of the reaction mixture being maintained at 5 by the simultaneous addition of an aqueous sodium hydroxide solution. The pH of the reaction mixture is then adjusted to 1.8, and the resulting precipitate is filtered off and dried, yielding 38.5 parts of an amine of formula $D_{10}$—$NH_2$ wherein $D_{10}$ corresponds to a radical of formula

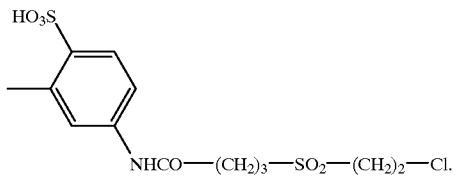

EXAMPLE 2

38.5 parts of an amine of formula $D_{10}$—$NH_2$ according to Example 1 are dissolved neutrally in 400 parts of water, and 25 parts of a 4N sodium nitrite solution are added. The resulting solution is added dropwise at from 0 to 3° C. to a mixture of ice and 25 parts of concentrated hydrochloric acid. The mixture is stirred at that temperature for 1 hour.

EXAMPLE 3

26.7 parts of an amine of formula $D_{11}$—$NH_2$ wherein $D_{11}$ is a radical of formula

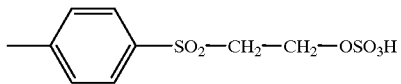

are introduced into 100 parts of water and stirred thoroughly. At 10° C., there are added to the resulting suspension first 24 parts of a 4N sodium nitrite solution and then 43 parts of a 31% naphthalenesulfonic acid solution. The mixture is then stirred at from 15 to 20° C. for 3 hours.

EXAMPLES 4 to 29

Analogously to the procedure described in Example 2 or 3 it is possible to prepare the diazo compounds of the amines listed in Table 1 by using instead of the amine of formula $D_{10}$—$NH_2$ or $D_{11}$—$NH_2$ mentioned in Example 2 or 3 an equimolar amount of an amine of formula $D_{xy}$—$NH_2$ mentioned in Table 1.

TABLE 1

| Ex. | $D_{xy}$-$NH_2$ | $D_{xy}$ |
|---|---|---|
| 4 | $D_{12}$-$NH_2$ | $D_{12}$ = —⟨benzene⟩—$SO_2$—$CH_2$—$CH_2$—$OSO_3H$ |

TABLE 1-continued

| Ex. | $D_{xy}$-NH$_2$ | |
|---|---|---|
| 5 | $D_{13}$-NH$_2$ | $D_{13}$ = 4-(2-sulfatoethylsulfonyl)-2-sulfophenyl: HO$_3$S-substituted phenyl with —SO$_2$—CH$_2$—CH$_2$—OSO$_3$H |
| 6 | $D_{14}$-NH$_2$ | $D_{14}$ = HO$_3$S-substituted phenyl with —HN—C(O)—CHBr—CH$_2$Br |
| 7 | $D_{15}$-NH$_2$ | $D_{15}$ = phenyl—CONH—(CH$_2$)$_2$—SO$_2$—(CH$_2$)$_2$—Cl |
| 8 | $D_{16}$-NH$_2$ | $D_{16}$ = HO$_3$S-substituted phenyl—CONH—(CH$_2$)$_2$—SO$_2$—(CH$_2$)$_2$—Cl |
| 9 | $D_{17}$-NH$_2$ | $D_{17}$ = phenyl—CONH—(CH$_2$)$_2$—SO$_2$—(CH$_2$)$_2$—OSO$_3$H |
| 10 | $D_{18}$-NH$_2$ | $D_{18}$ = HO$_3$S-substituted phenyl—CONH—(CH$_2$)$_2$—SO$_2$—(CH$_2$)$_2$—OSO$_3$H |
| 11 | $D_{19}$-NH$_2$ | $D_{19}$ = meta-substituted phenyl—CONH—(CH$_2$)$_2$—SO$_2$—(CH$_2$)$_2$—OSO$_3$H |
| 12 | $D_{20}$-NH$_2$ | $D_{20}$ = 4-OCH$_3$-substituted phenyl—SO$_2$—CH$_2$—CH$_2$—OSO$_3$H |
| 13 | $D_{21}$-NH$_2$ | $D_{21}$ = 4-OCH$_3$, 5-CH$_3$-substituted phenyl—SO$_2$—CH$_2$—CH$_2$—OSO$_3$H |
| 14 | $D_{22}$-NH$_2$ | $D_{22}$ = 4-OCH$_3$, 5-OCH$_3$-substituted phenyl—SO$_2$—CH$_2$—CH$_2$—OSO$_3$H |

TABLE 1-continued
| Ex. | $D_{xy}$-$NH_2$ | |
|---|---|---|
| 15 | $D_{23}$-$NH_2$ | 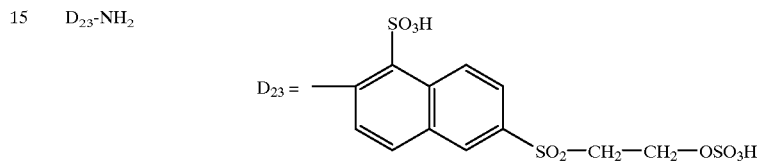 |
| 16 | $D_{24}$-$NH_2$ | 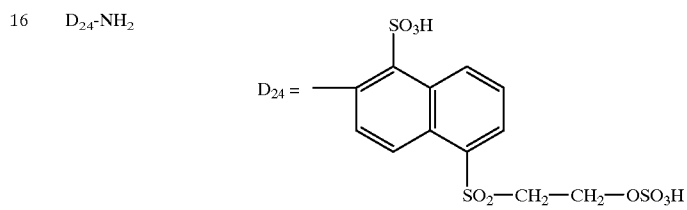 |
| 17 | $D_{25}$-$NH_2$ | 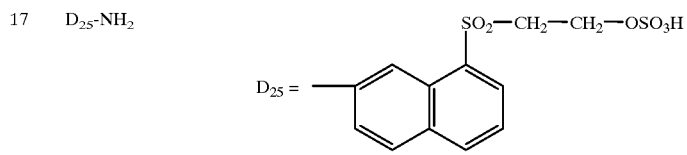 |
| 18 | $D_{26}$-$NH_2$ | 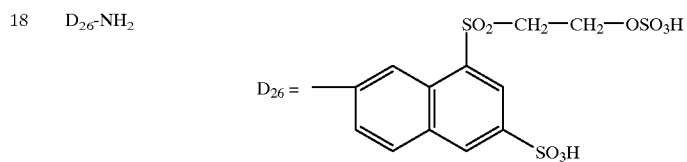 |
| 19 | $D_{27}$-$NH_2$ | 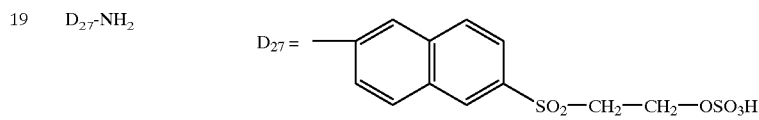 |
| 20 | $D_{28}$-$NH_2$ | 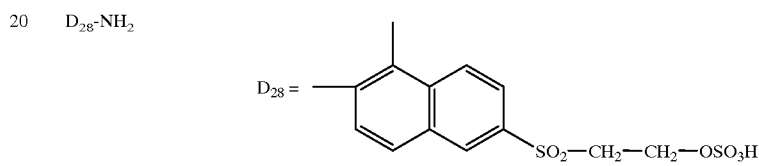 |
| 21 | $D_{29}$-$NH_2$ | 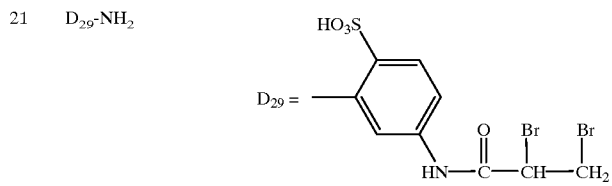 |
| 22 | $D_{30}$-$NH_2$ | 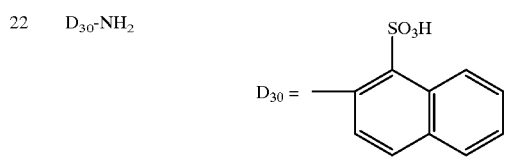 |

TABLE 1-continued
| Ex. | $D_{xy}-NH_2$ | |
|---|---|---|
| 23 | $D_{31}-NH_2$ | $D_{31}=$ 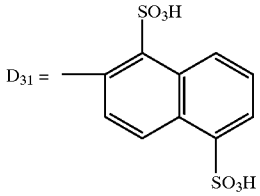 |
| 24 | $D_{32}-NH_2$ | $D_{32}=$ 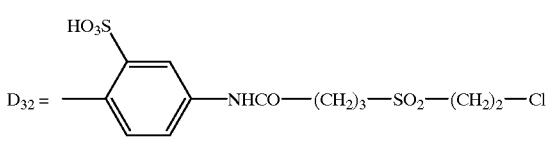 |
| 25 | $D_{33}-NH_2$ | $D_{33}=$ 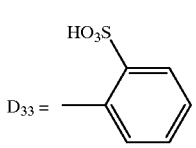 |
| 26 | $D_{34a}-NH_2$ to $D_{34q}-NH_2$ | $D_{34a}$ to $D_{34q}=$ 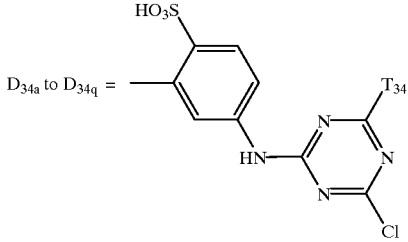 |
| | | $T_{34}:$ |
| 26a | $D_{34a}-NH_2$ | $T_{34a}=$ 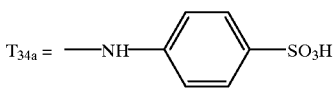 |
| 26b | $D_{34b}-NH_2$ | $T_{34b}=$ 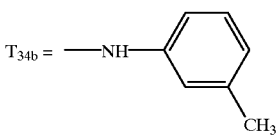 |
| 26c | $D_{34c}-NH_2$ | $T_{34c}=$ 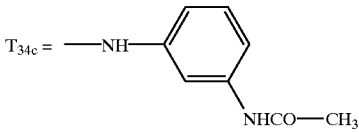 |
| 26d | $D_{34d}-NH_2$ | $T_{34d}=$ 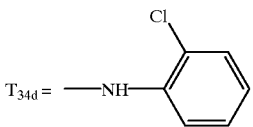 |
| 26e | $D_{34e}-NH_2$ | $T_{34e}=-NHCH_2CH_2OH$ |
| 26f | $D_{34f}-NH_2$ | $T_{34f}=-N(CH_2CH_2OH)_2$ |
| 26g | $D_{34g}-NH_2$ | $T_{34g}=$ 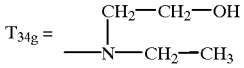 |

TABLE 1-continued

| Ex. | $D_{xy}$-NH$_2$ | |
|---|---|---|
| 26h | $D_{34h}$-NH$_2$ | $T_{34h} = -N(CH_3)-CH_2-CH_2-OH$ |
| 26i | $D_{34i}$-NH$_2$ | $T_{34i} = -NH-(CH_2)_2-O-(CH_2)_2-OH$ |
| 26j | $D_{34j}$-NH$_2$ | $T_{34j} = -NHCH_2CH_2SO_3H$ |
| 26k | $D_{34k}$-NH$_2$ | $T_{34k} = -N(CH_3)-CH_2-CH_2-SO_3H$ |
| 26l | $D_{34l}$-NH$_2$ | $T_{34l} = $ —N(morpholino) |
| 26m | $D_{34m}$-NH$_2$ | $T_{34m} = -NH-(CH_2)_2-SO_2-(CH_2)_2-Cl$ |
| 26n | $D_{34n}$-NH$_2$ | $T_{34n} = -NH-(CH_2)_2-O-(CH_2)_2-SO_2-(CH_2)_2-Cl$ |
| 26o | $D_{34o}$-NH$_2$ | $T_{34o} = -NH-C_6H_4-SO_2-CH_2CH_2-OSO_3H$ |
| 26p | $D_{34p}$-NH$_2$ | $T_{34p} = -NH-C_6H_4-CONH(CH_2)_2SO_2(CH_2)_2OSO_3H$ (meta) |
| 26q | $D_{34q}$-NH$_2$ | $T_{34q} = -NH-$ (2-SO$_3$H, 4-NHCO-CHBr-CH$_2$Br phenyl) |
| 27 | $D_{35}$-NH$_2$ | $D_{35} = $ 4-HO$_3$S-3-(2,5,6-trichloropyrimidin-4-ylamino)phenyl |
| 28 | $D_{36}$-NH$_2$ | $D_{36} = $ 4-HO$_3$S-3-(5-chloro-2,6-difluoropyrimidin-4-ylamino)phenyl |

TABLE 1-continued

| Ex. | $D_{xy}$-$NH_2$ |
|---|---|
| 29 | $D_{37}$-$NH_2$ $\quad D_{37}=$ (structure: sulfophenyl-NH linked to 2,4-dichloro-5-cyanopyrimidine) |

EXAMPLE 30 a) 19 parts of cyanuric chloride are dispersed in 75 parts of ice and 75 parts of water with the addition of a wetting agent. A neutral solution of 31.9 parts of 1-amino-8-naphthol-3,6-disulfonic acid in 350 parts of water is added to the resulting dispersion. After several hours the pH of the reaction mixture is adjusted to from 4 to 5 by the addition of an aqueous sodium hydroxide solution.

b) The diazo compound obtained according to Example 3 is coupled at pH 4 to 5 to the condensate contained in the reaction mixture according to a).

c) 27.1 parts of 1-amino-8-napthol-3,6-disulfonic acid are added, in portions at 10° C., to the resulting solution according to b), the pH of the reaction mixture being maintained at 4 by the simultaneous addition of an aqueous sodium hydroxide solution. After about 1 hour, the pH of the reaction mixture is adjusted gradually to 6 by the addition of an aqueous sodium hydroxide solution, and the reaction mixture is heated to 20° C. and stirred to complete the reaction.

d) The suspension of the diazo compound according to Example 2 is added at 10° C. and pH 7 to 7.5 to the solution obtained according to c). To complete the reaction, the mixture is stirred for one hour at 25° C. and pH 7.5. The resulting solution is then clarified by filtration, freed of salt by dialysis and freeze-dried, yielding 140 parts of a compound which in the form of the free acid corresponds to formula (101)

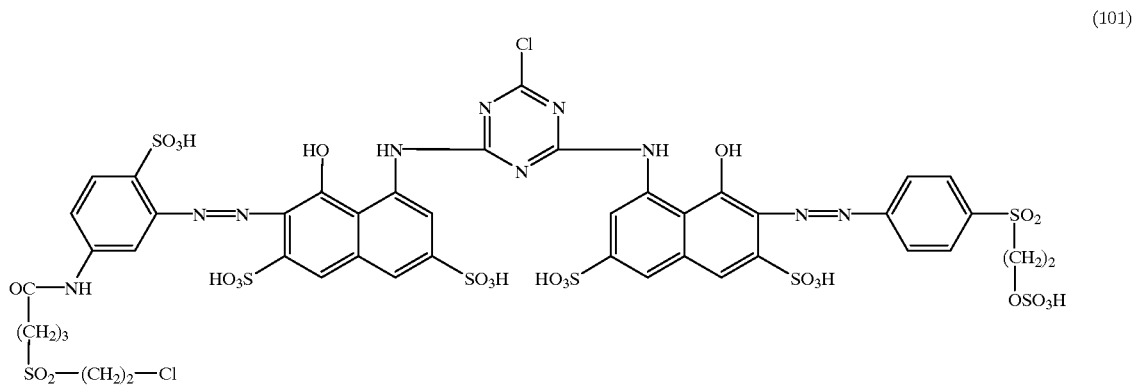

and dyes cotton and wool a red shade having good aglround properties.

EXAMPLES 31 to 73

Following the procedure as described in Example 30, but using instead of the diazo compound according to Example 3 an equimolar amount of a diazo compound according to one of Examples 2 and 4 to 33, there is obtained a compound which in the form of the free acid corresponds to formula

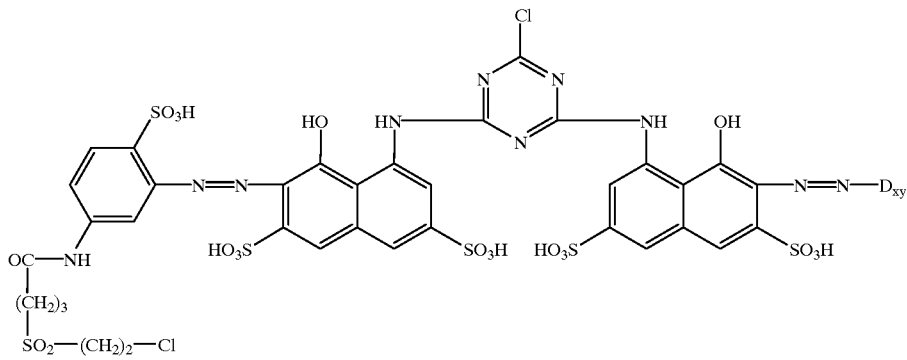

wherein $D_{xy}$ is one of the radicals listed in Table 2, those having the definitions given in Example 2 and Table 1. The dye cotton and wool the shade indicated in each case, which have good allround properties.

TABLE 2

| Ex. | $D_{xy}$ | Shade |
|---|---|---|
| 31 | $D_{10}$ | red |
| 32 | $D_{12}$ | red |
| 33 | $D_{13}$ | red |
| 34 | $D_{14}$ | red |
| 35 | $D_{15}$ | red |
| 36 | $D_{16}$ | red |
| 37 | $D_{17}$ | red |
| 38 | $D_{18}$ | red |
| 39 | $D_{19}$ | red |
| 40 | $D_{20}$ | red |
| 41 | $D_{21}$ | red |
| 42 | $D_{22}$ | red |
| 43 | $D_{23}$ | red |
| 44 | $D_{24}$ | red |
| 45 | $D_{25}$ | red |
| 46 | $D_{26}$ | red |
| 47 | $D_{27}$ | red |
| 48 | $D_{28}$ | red |
| 49 | $D_{29}$ | red |
| 50 | $D_{30}$ | red |
| 51 | $D_{31}$ | red |
| 52 | $D_{32}$ | red |
| 53 | $D_{33}$ | red |
| 54 | $D_{34a}$ | red |
| 55 | $D_{34b}$ | red |

TABLE 2-continued

| Ex. | $D_{xy}$ | Shade |
|---|---|---|
| 56 | $D_{34c}$ | red |
| 57 | $D_{34d}$ | red |
| 58 | $D_{34e}$ | red |
| 59 | $D_{34f}$ | red |
| 60 | $D_{34g}$ | red |
| 61 | $D_{34h}$ | red |
| 62 | $D_{34i}$ | red |
| 63 | $D_{34j}$ | red |
| 64 | $D_{34k}$ | red |
| 65 | $D_{34l}$ | red |
| 66 | $D_{34m}$ | red |
| 67 | $D_{34n}$ | red |
| 68 | $D_{34o}$ | red |
| 69 | $D_{34p}$ | red |
| 70 | $D_{34q}$ | red |
| 71 | $D_{35}$ | red |
| 72 | $D_{36}$ | red |
| 73 | $D_{37}$ | red |

EXAMPLE 74

Following the procedure as described in Example 30, but using instead of 27.1 parts of I1-amino-8-naphthol-3,6-disulfonic acid in step c) an equimolar amount of 2-amino-5-naphthol-7-sulfonic acid, there is obtained a compound which in the form of the free acid corresponds to formula (102)

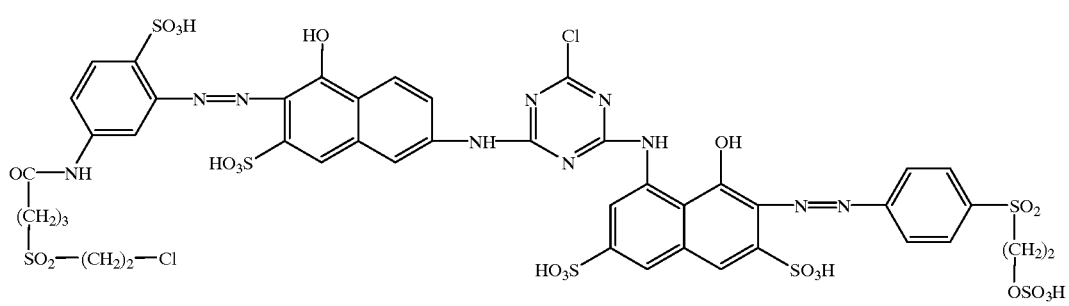

and dyes cotton and wool a red shade having good allround properties.

EXAMPLE 75

Following the procedure as described in Example 30, but using instead of 31.9 parts of 1-amino-8-naphthol-3,6-disulfonic acid in step a) an equimolar amount of 2-N-methylamino-5-naphthol-7-sulfonic acid, there is obtained a compound which in the form of the free acid corresponds to formula (103)

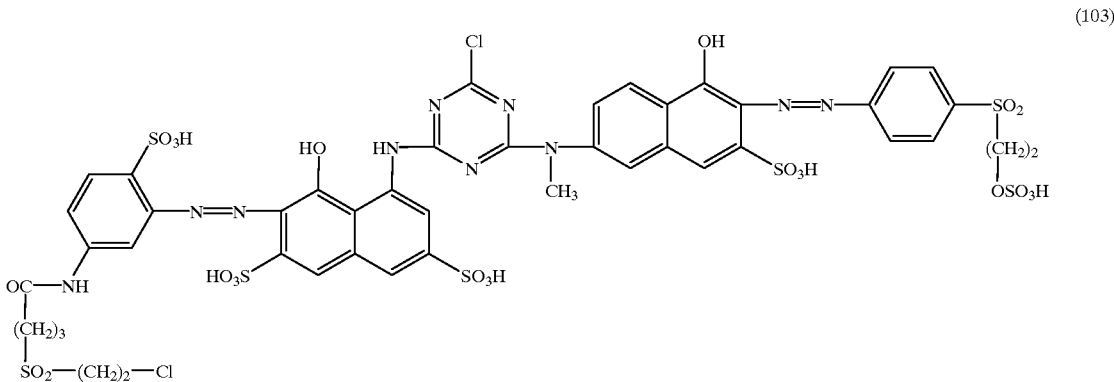

(103)

and dyes cotton and wool a red shade having good aglround properties.

EXAMPLE 76

Following the procedure as described in Example 30, but using instead of the diazo compound according to Example 2 in step d) an equimolar amount of the diazo compound according to Example 24, there is obtained a compound which in the form of the free acid corresponds to formula (104)

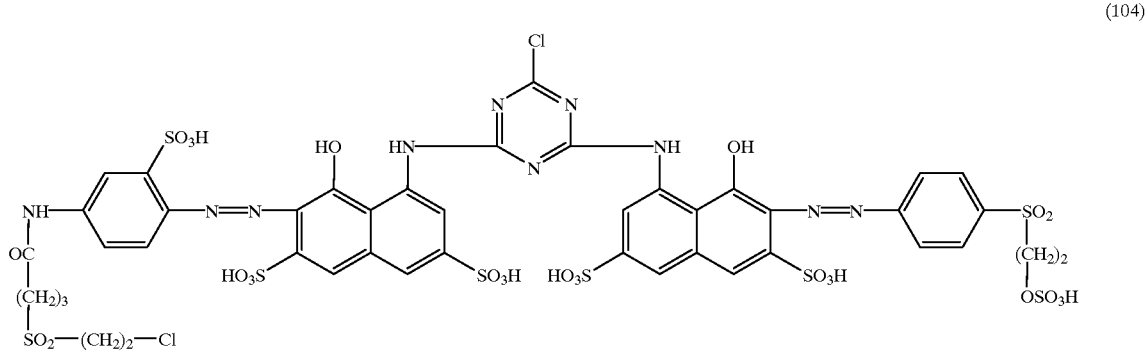

(104)

and dyes cotton and wool a red shade having good allround properties.

EXAMPLE 77

Following the procedure as described in Example 30, but using instead of 31.9 parts of 1-amino-8-naphthol-3,6-disulfonic acid in step a) an equimolar amount of 2-N-methylamino-5-naphthol-7-suffonic acid and instead of the diazo compound according to Example 2 in step d) an equimolar amount of the diazo compound according to Example 24, there is obtained a compound which in the form of the free acid corresponds to formula (105)

(105)

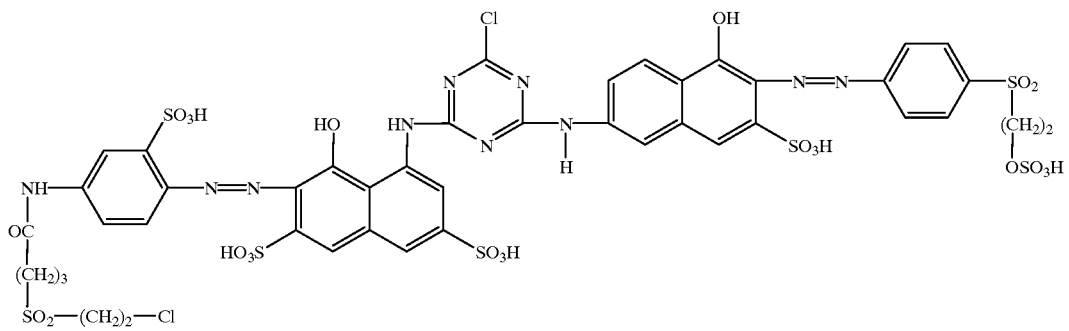

and dyes cotton and wool a red shade having good allround properties.

EXAMPLE 78 a) 12.2 parts of an amine of formula $D_{38}$—$NH_2$ wherein $D_{38}$ is a radical of formula

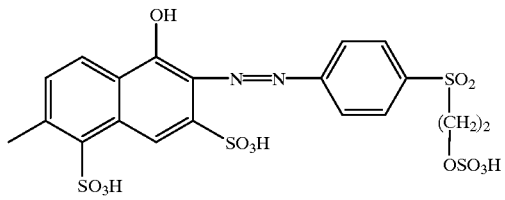

are dissolved in 180 parts of water. To the resulting solution there are added at 25° C. first 5 parts of a 4N sodium nitrite solution and then 16 parts of a 31% naphthalenesulfonic acid solution. The mixture is then stirred for several hours at 25° C. to complete the reaction.

b) A solution of 10.3 parts of 1-[γ-(β-chloroethylsulfonyl)butyrylamino]-8-naphthol-3,6-disulfonic acid in 50 parts of water is added to the solution of the diazo compound obtained according to a), the pH of the reaction mixture being adjusted first to 6 with sodium hydrogen carbonate and then to 8 with sodium carbonate. When the reaction is complete, the pH is adjusted to 6 with dilute hydrochloric acid, the product is precipitated by the addition of potassium chloride and the precipitate is filtered and washed. For further purification, the precipitate is dissolved in water and precipitated by the addition of acetone. The precipitate is washed with acetone and dried, yielding 15.4 parts of a compound which in the form of the free acid corresponds to formula (106)

(106)

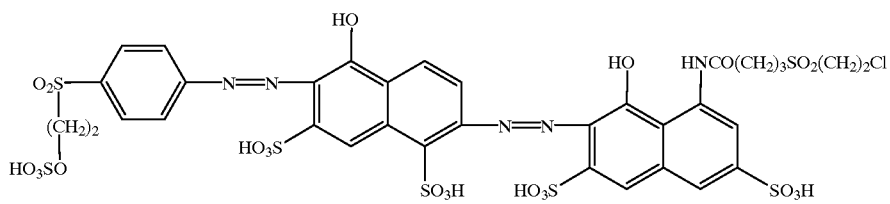

and dyes cotton and wool a red shade having good allround properties.

EXAMPLES 79 to 111

Following the procedure as described in Example 78, but using instead of 12.2 parts of an amine of formula $D_{38}$—$NH_2$ an equimolar amount of an amine of formula $D_{xy}$—$NH_2$, there is obtained a compound which in the form of the free acid corresponds to formula

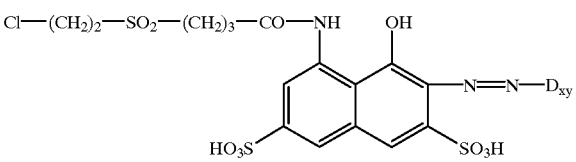

wherein $D_{xy}$ corresponds to one of the radicals listed in Table 3. The dyes dye cotton and wool the shade indicated in each case, which have good allround fastness properties.

TABLE 3

| Ex. | Amine $D_{xy}$-$NH_2$ | $D_{xy}$ | Shade |
|---|---|---|---|
| 79 | $D_{39}$-$NH_2$ | $D_{39}$ = 4-methoxy-2-methylphenyl-N=N-(3-sulfophenyl) | dark violet |
| 80 | $D_{40}$-$NH_2$ | $D_{40}$ = 4-methoxy-2-methylphenyl-N=N-(2-sulfo-4-sulfophenyl) | dark blue |
| 81 | $D_{41}$-$NH_2$ | $D_{41}$ = 4-methoxy-2-methylphenyl-N=N-[2-sulfo-5-(HNCO(CH$_2$)$_3$SO$_2$(CH$_2$)$_2$Cl)phenyl] | navy |
| 82 | $D_{42}$-$NH_2$ | $D_{42}$ = 4-methoxy-2-methylphenyl-N=N-[2-sulfo-4-(NHCO(CH$_2$)$_3$SO$_2$(CH$_2$)$_2$Cl)phenyl] | navy |
| 83 | $D_{43}$-$NH_2$ | $D_{43}$ = 4-methoxy-2-methylphenyl-N=N-[2-sulfo-4-(CONH(CH$_2$)$_2$SO$_2$—CH=CH$_2$)phenyl] | dark blue |
| 84 | $D_{44}$-$NH_2$ | $D_{44}$ = 4-methoxy-2-methylphenyl-N=N-[2-sulfo-4-(SO$_2$—CH$_2$—CH$_2$—OSO$_3$H)phenyl] | blue |
| 85 | $D_{45}$-$NH_2$ | $D_{45}$ = 4-(OCH$_2$CH$_2$OH)-2-methylphenyl-N=N-[2-sulfo-4-(SO$_2$—CH$_2$—CH$_2$—OSO$_3$H)phenyl] | blue |

TABLE 3-continued

| Ex. | Amine $D_{xy}$-$NH_2$ | | Shade |
|---|---|---|---|
| 86 | $D_{46}$-$NH_2$ | $D_{46}$ = [structure: 2,5-dimethyl-4-methylphenyl-N=N-phenyl(SO3H)-SO2-CH2-CH2-OSO3H] | violet |
| 87 | $D_{47}$-$NH_2$ | $D_{47}$ = [structure: naphthalene with SO3H, SO2(CH2)2OSO3H, azo-linked to pyrazolone with OH, CH3, phenyl-CONH-tolyl-SO3H] | red |
| 88 | $D_{48}$-$NH_2$ | $D_{48}$ = [structure: naphthalene with SO3H and SO2(CH2)2OSO3H] | red |
| | $D_{49}$-$NH_2$ to $D_{70}$-$NH_2$ | $D_{49}$ to $D_{70}$ = [structure: phenyl with HO3S, NH-triazine(T_xy)(Cl)] | |
| | $T_{xy}$: | | |
| 89 | $D_{49}$-$NH_2$ | $T_{49}$ = [structure: naphthalene with OH, N(CH3)2, SO3H, azo-linked to phenyl-SO2-(CH2)2-OSO3H] | red |
| 90 | $D_{50}$-$NH_2$ | $T_{50}$ = [structure: naphthalene with NH, OH, HO3S, SO3H, azo-linked to phenyl-SO2-(CH2)2-OSO3H] | red |
| 91 | $D_{51}$-$NH_2$ | $T_{51}$ = [structure: naphthalene with NH, OH, HO3S, SO3H, azo-linked to phenyl-SO2-(CH2)2-OSO3H] | red |

TABLE 3-continued

| Ex. | Amine $D_{xy}$-$NH_2$ | | Shade |
|---|---|---|---|
| 92 | $D_{52}$-$NH_2$ | $T_{52}$ = [structure: 8-methylamino-1-hydroxy-naphthalene-3,6-disulfonic acid coupled via azo to 2-methoxy-5-(2-sulfatoethylsulfonyl)phenyl] | red |
| 93 | $D_{53}$-$NH_2$ | $T_{53}$ = [structure: 8-methylamino-1-hydroxy-naphthalene-3,6-disulfonic acid coupled via azo to 1-sulfo-2-naphthyl] | red |
| 94 | $D_{54}$-$NH_2$ | $T_{54}$ = [structure: 8-methylamino-1-hydroxy-naphthalene-3,6-disulfonic acid coupled via azo to 2-sulfophenyl] | red |
| 95 | $D_{55}$-$NH_2$ | $T_{55}$ = [structure: 8-methylamino-1-hydroxy-naphthalene-3,6-disulfonic acid coupled via azo to 2-sulfo-5-methylphenyl] | red |
| 96 | $D_{56}$-$NH_2$ | $T_{56}$ = [structure: 8-methylamino-1-hydroxy-naphthalene-3,6-disulfonic acid coupled via azo to 2-sulfo-5-methoxyphenyl] | red |
| 97 | $D_{57}$-$NH_2$ | $T_{57}$ = [structure: 6-methylamino-1-hydroxy-naphthalene-3-sulfonic acid coupled via azo to 2-sulfo-4-methoxy-5-sulfophenyl] | red |
| 98 | $D_{58}$-$NH_2$ | $T_{58}$ = [structure: 6-methylamino-1-hydroxy-naphthalene-3-sulfonic acid coupled via azo to 1,5-disulfo-2-naphthyl] | red |

TABLE 3-continued

| Ex. | Amine $D_{xy}$-$NH_2$ | | Shade |
|---|---|---|---|
| 99 | $D_{59}$-$NH_2$ | $T_{59}$ = (structure: 8-amino-1-hydroxy-3,6-disulfo-naphthalene azo-coupled to 1-sulfo-6-(SO$_2$(CH$_2$)$_2$OSO$_3$H)-naphthalene) | red |
| 100 | $D_{60}$-$NH_2$ | $T_{60}$ = (structure: 6-amino-1-hydroxy-3-sulfo-naphthalene azo-coupled to 4-sulfo-phenyl with HNCO-(CH$_2$)$_3$-SO$_2$(CH$_2$)$_2$Cl substituent) | red |
| 101 | $D_{61}$-$NH_2$ | $T_{61}$ = (structure: 8-amino-1-hydroxy-3,6-disulfo-naphthalene azo-coupled to 4-sulfo-phenyl with HNCO-(CH$_2$)$_3$-SO$_2$(CH$_2$)$_2$Cl substituent) | red |
| 102 | $D_{62}$-$NH_2$ | $T_{62}$ = (structure: 8-amino-1-hydroxy-3,6-disulfo-naphthalene azo-coupled to 4-sulfo-phenyl with HNCO-CHBr-CH$_2$Br substituent) | red |
| 103 | $D_{63}$-$NH_2$ | $T_{63}$ = (structure: 8-amino-1-hydroxy-3,6-disulfo-naphthalene azo-coupled to 4-sulfo-phenyl with CO-NH-(CH$_2$)$_2$-SO$_2$(CH$_2$)$_2$Cl substituent) | red |
| 104 | $D_{64}$-$NH_2$ | $T_{64}$ = (structure: 8-amino-1-hydroxy-3,6-disulfo-naphthalene azo-coupled to phenyl with CO-NH-(CH$_2$)$_2$-SO$_2$(CH$_2$)$_2$Cl substituent) | red |

TABLE 3-continued

| Ex. | Amine $D_{xy}-NH_2$ | | Shade |
|---|---|---|---|
| 105 | $D_{65}-NH_2$ | $T_{65}$ = [structure with naphthalene bearing -NH, OH, HO$_3$S, SO$_3$H groups, azo-linked to phenyl-C(O)NH-(CH$_2$)$_2$-SO$_2$(CH$_2$)$_2$Cl] | red |
| 106 | $D_{66}-NH_2$ | $T_{66}$ = [structure with naphthalene bearing -NH, OH, HO$_3$S, SO$_3$H groups, azo-linked to naphthalene with SO$_3$H, SO$_3$H] | red |
| 107 | $D_{67}-NH_2$ | $T_{67}$ = [structure with naphthalene bearing -NH, OH, HO$_3$S, SO$_3$H groups, azo-linked to phenyl-SO$_2$-(CH$_2$)$_2$-OSO$_3$H] | red |
| 108 | $D_{68}-NH_2$ | $T_{68}$ = [structure with naphthalene bearing -NH, OH, HO$_3$S, SO$_3$H groups, azo-linked to phenyl-SO$_2$-CH=CH$_2$] | red |
| 109 | $D_{69}-NH_2$ | $T_{69}$ = [structure with naphthalene bearing -NH, OH, HO$_3$S, SO$_3$H groups, azo-linked to phenyl with HO$_3$S and CH$_3$] | red |
| 110 | $D_{70}-NH_2$ | $T_{70}$ = [structure with naphthalene bearing -NH, OH, HO$_3$S, SO$_3$H groups, azo-linked to phenyl with HO$_3$S and OCH$_3$] | red |

TABLE 3-continued

| Ex. | Amine $D_{xy}$-$NH_2$ | | Shade |
|---|---|---|---|
| 111 | $D_{71}$-$NH_2$ | 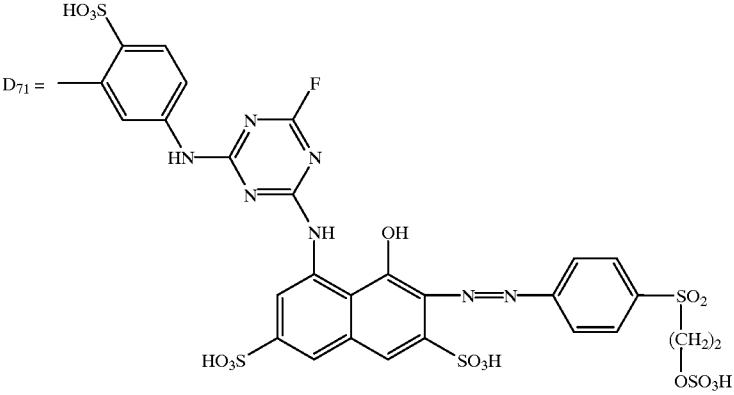 | red |

EXAMPLE 112

Following the procedure as described in Example 78, but using instead of 10.3 parts of 1-[γ-(β-chloroethylsulfonyl)butyrylamino]-8-naphthol-3,6-disulfonic acid an equimolar amount of 2-[γ-(β-chloroethylsulfonyl)butyrylamino]-5-naphthol-1,7-disulfonic acid, there is obtained a compound which in the form of the free acid corresponds to formula (107)

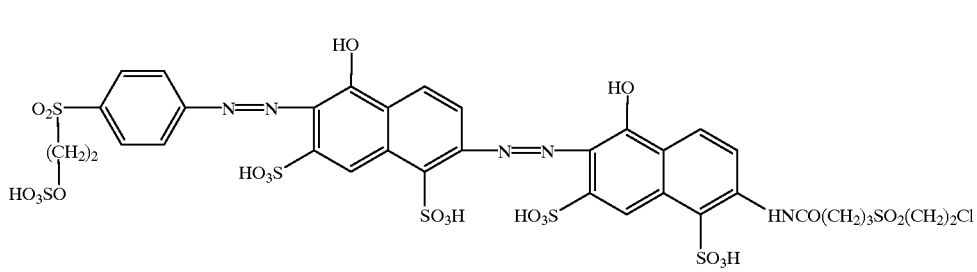

and dyes cotton and wool a red shade having good allround properties.

EXAMPLE 113

Following the procedures as described Example 78, but using instead of 12.2 parts of an amine of formula $D_{38}$—$NH_2$ an equimolar amount of an amine of formula $D_{50}$—$NH_2$ and instead of 10.3 parts of 1-[γ-(γ-chloroethylsulfonyl)butyrylamino]-8-naphthol-3,6-disulfonic acid an equimolar amount of 2-[γ-(β-chloroethylsulfonyl)butyrylamino]-5naphthol-1,7-disulfonic acid, there is obtained a compound which in the formn of the free acid corresponds to formula (108)

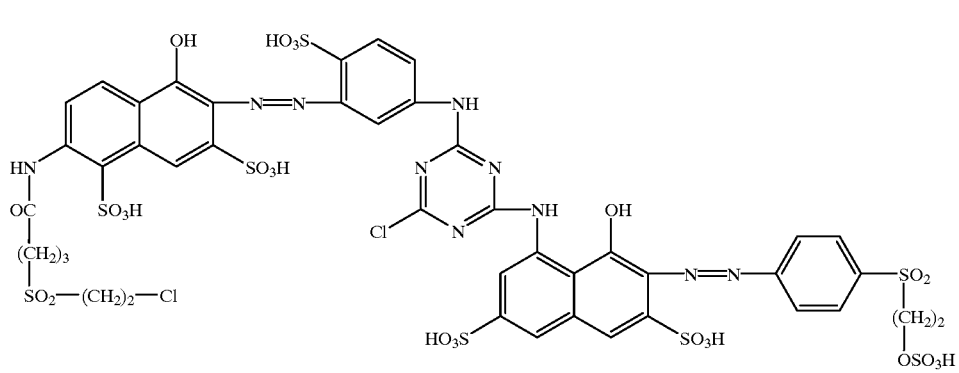

and dyes cotton and wool a red shade having good allround properties.

EXAMPLES 114 to 117

Likewise analogously to the procedure described in Example 78 it is possible to prepare the compounds which in the form of the free acid correspond to formulae (109) to (112) and dye cotton and wool the shades indicated, which have good allround properties.

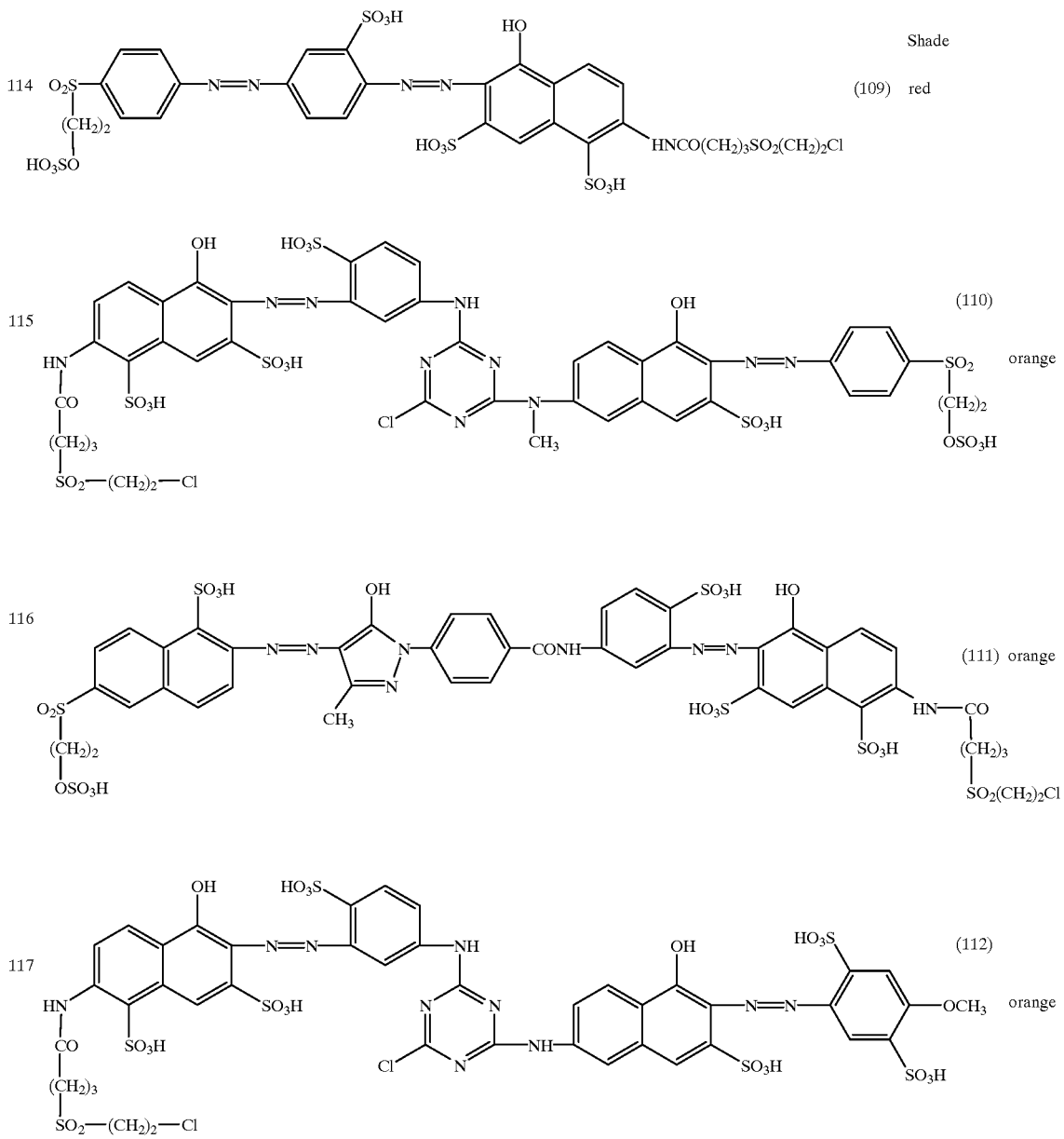

EXAMPLE 118 a) 7.3 parts of a diamine of formula $H_2N-D_{72}-NH_2$ wherein $D_{72}$ is a radical of formula

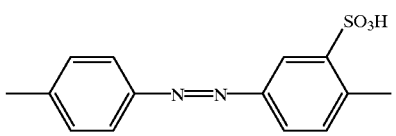

are dissolved in 450 parts of water. 12.5 parts of a 4N sodium nitrite solution are then added to the resulting solution, and the solution so obtained is then added dropwise at from 5 to 10° C. to a mixture of 40 parts of a 31% naphthalenesulfonic acid solution and 50 parts of ice. The mixture is stirred for several hours at from 0 to 10° C. to complete the reaction.

b) 25.8 parts of 1-[γ-(β-chloroethylsulfonyl) butyrylamino]-8-naphthol-3,6disulfonic acid are added in portions to the suspension of the tetraazo compound obtained according to a), the pH of the reaction mixture being adjusted first to 6.4 with sodium hydrogen carbonate and then to 8.5 with sodium carbonate. When the reaction is complete, the pH is adjusted to 6 with dilute hydrochloric acid and the product is precipitated by the addition of acetone and potassium chloride; the precipitate is filtered, washed with acetone and dried, yielding 14.6 parts of a compound which in the form of the free acid corresponds to formula (113)

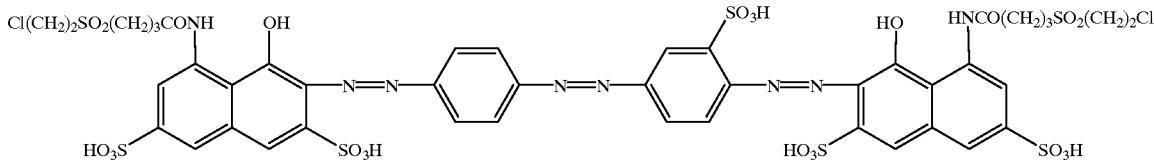

(113)

and dyes cotton and wool a blue shade having good allround properties.

EXAMPLES 119 to 129

Following the procedure as described in Example 118, but using instead of 7.3 parts of a diamine of formula $H_2N$—$D_{72}$—$NH_2$ an equimolar amount of a diamine of formula $H_2N$—$D_{xy}$—$NH_2$, there is obtained a compound which in the form of the free acid corresponds to the following formula

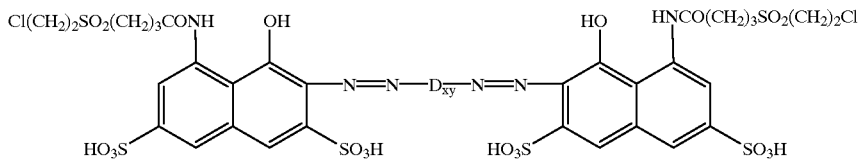

wherein $D_{xy}$ is a radical listed in Table 4. The dyes dye cotton and wool the shade indicated in each case, which have good allround properties.

TABLE 4

| Ex. | Diamine $H_2N$-$D_{xy}$-$NH_2$ | $D_{xy}$ | Shade |
|---|---|---|---|
| 119 | $H_2N$-$D_{73}NH_2$ | $D_{73}$ = ―⟨phenyl⟩―C(CH₃)₂―⟨phenyl⟩― | red |
| 120 | $H_2N$-$D_{74}NH_2$ | $D_{74}$ = ―⟨3-OCH₃-phenyl⟩―⟨3-OCH₃-phenyl⟩― | blue |

TABLE 4-continued
| Ex. | Diamine H$_2$N-D$_{xy}$-NH$_2$ | D$_{xy}$ | Shade |
|---|---|---|---|
| 121 | H$_2$N-D$_{75}$NH$_2$ | 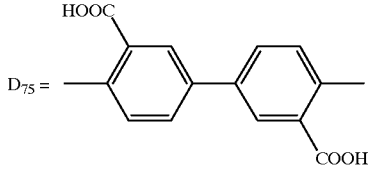 D$_{75}$ = | blue |
| 122 | H$_2$N-D$_{76}$NH$_2$ | 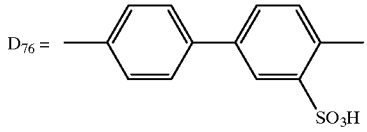 D$_{76}$ = | blue |
| 123 | H$_2$N-D$_{77}$NH$_2$ | 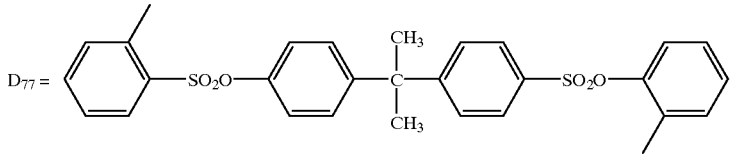 D$_{77}$ = | red |
| 124 | H$_2$N-D$_{78}$NH$_2$ | 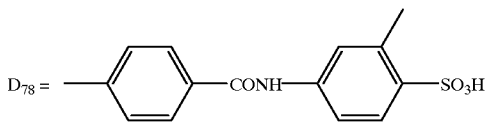 D$_{78}$ = | red |
| 125 | H$_2$N-D$_{79}$NH$_2$ | 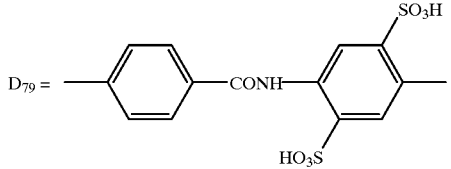 D$_{79}$ = | magenta |
| 126 | H$_2$N-D$_{80}$NH$_2$ | 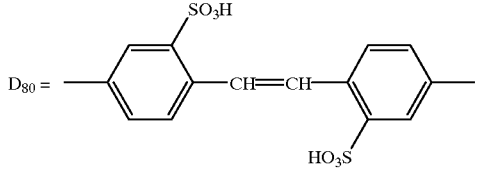 D$_{80}$ = | blue |
| 127 | H$_2$N-D$_{81}$NH$_2$ | 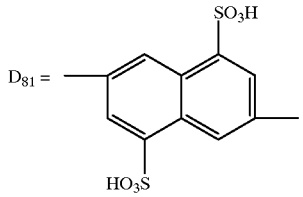 D$_{81}$ = | blue |
| 128 | H$_2$N-D$_{82}$NH$_2$ | 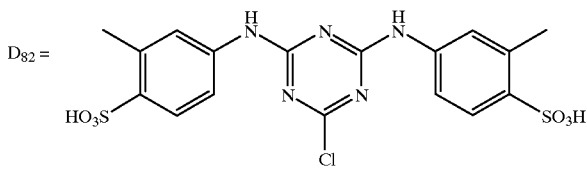 D$_{82}$ = | red |

TABLE 4-continued

| Ex. | Diamine $H_2N-D_{xy}-NH_2$ | $D_{xy}$ | Shade |
|---|---|---|---|
| 129 | $H_2N-D_{83}NH_2$ | $D_{83}$ = (structure shown) | red |

(structure for D_{83}: bis(3-methyl-4-sulfophenylamino)-triazin-2-ol)

EXAMPLE 130

Following the procedure as described in Example 118, but using instead of 25.8 parts of 1-[γ-(β-chloroethylsulfonyl)butyrylamino]-8-naphthol-3,6-disulfonic acid an equimolar amount of 2-[γ-(β-chloroethylsulfonyl)butyrylamino]-5-naphthol-1,7-disulfonic acid, there is obtained a compound which in the form of the free acid corresponds to formula (114)

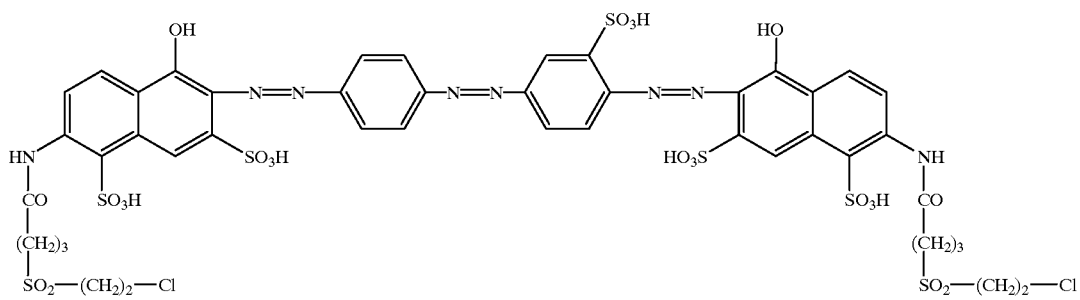

(114)

and dyes cotton and wool a violet shade having good allround properties.

EXAMPLE 131

Following the procedure as described in Example 118, but using instead of 7.3 parts of a diamine of formula $H_2N$—$D_{72}$—$NH_2$ an equimolar amount of a diamine of formula $H_2N$—$D_{74}$—$NH_2$ and instead of 25.8 parts of 1-[γ-(β-chloroethylsulfonyl)butyrylamino]-8-naphthol-3,6-disulfonic acid an equimolar amount of 2-[γ-(β-chloroethylsulfonyl)butyrylamino]-5-naphthol-1,7-disulfonic acid, there is obtained a compound which in the form of the free acid corresponds to formula (115)

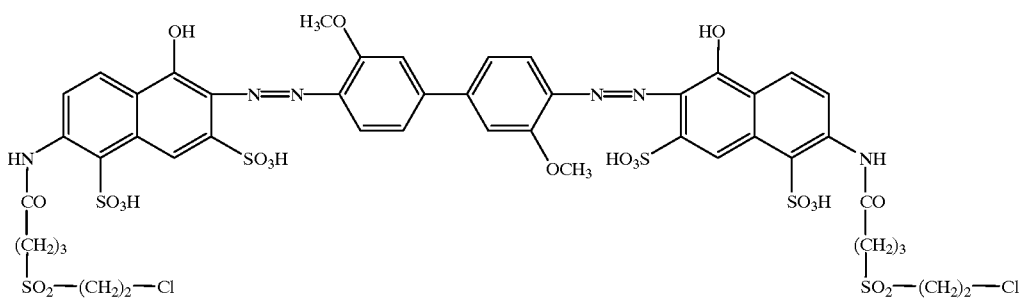

(115)

and dyes cotton and wool a violet shade having good allround properties.

EXAMPLES 132 and 133

Likewise analogously to the procedure described in Example 118 it is possible to prepare the compounds which in the form of the free acid correspond to formulae (116) and (117) and dye cotton and wool the shades indicated, which have good allround properties.

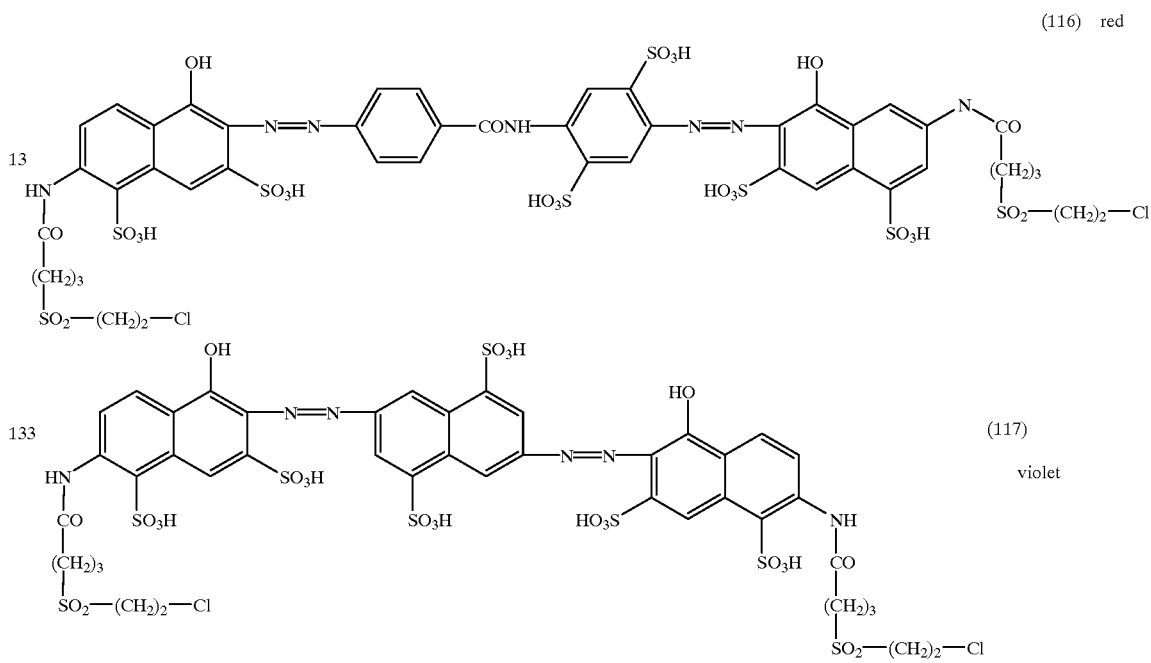

Dyeing Procedure I 100 parts of cotton fabric are placed at 60° C. in 1500 parts of a dyebath containing 45 g/l of sodium chloride and 2 parts of the reactive dye obtained according to Example 30. After 45 minutes at 60° C., 20 g/l of calcined soda are added. Dyeing is continued at that temperature for a further 45 minutes. The dyed goods are then rinsed, soaped at the boil for a quarter of an hour with a non-ionic detergent, rinsed again and dried.

As an alternative to that procedure, dyeing can be carried out at 80° C. instead of at 60° C.

Dyeing Procedure II 0.1 part of the dye according to Example 30 is dissolved in 200 parts of water, and 0.5 part of sodium sulfate, 0.1 part of a levelling agent (based on the condensation product of a higher aliphatic amine and ethylene oxide) and 0.5 part of sodium acetate are added. The pH is adjusted to a value of 5.5 with acetic acid (80%). The dyebath is heated at 50° C. for 10 minutes and then 10 parts of a woollen fabric are added. The dyebath is heated to a temperature of 100° C. in the course of about 50 minutes and dyeing is carried out at that temperature for 60 minutes. The dyebath is then cooled to 90° C. and the dyed goods are removed. The woollen fabric is washed with hot and cold water, then spun and dried.

Printing Procedure

While stirring rapidly, 3 parts of the dye obtained according to Example 30 are sprinkled into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric; drying is carried out and the resulting printed fabric is steamed in saturated steam at 102° C. for 2 minutes. The printed fabric is then rinsed, if desired soaped at the boil and again rinsed, and then dried.

What is claimed is:

1. A reactive dye of formula (1a)

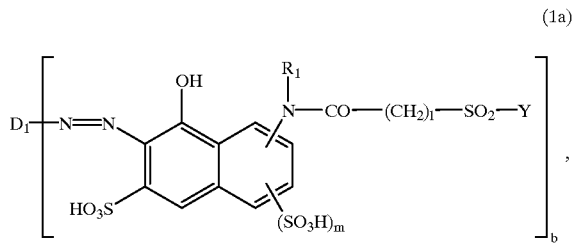

wherein
  b is the number 1,
  $D_1$ is the radical of an azo dye,
  $R_1$ is hydrogen or $C_1$–$C_4$alkyl,
  Y is vinyl or a radical —$CH_2$—$CH_2$—U and U is a group removable under alkaline conditions,
  l is the number 2, 3, 4, 5 or 6, and
  m is the number 0 or 1.

2. A reactive dye of formula (1b)

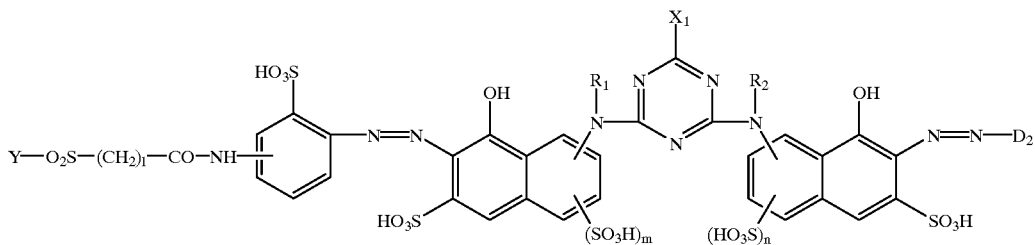
(1b)

wherein

D₂ is the radical of a diazo component of the benzene or naphthalene series,

R₁ and R₂ are each independently of the other hydrogen or C₁–C₄alkyl,

X₁ is fluorine or chlorine,

Y is vinyl or a radical —CH₂—CH₂—U and U is a group removable under alkaline conditions, l is the number 2, 3, 4, 5 or 6, and m and n are each independently of the other the number 0 or 1.

3. A reactive dye according to claim 1, wherein

D₁ as the radical of an azo dye is a radical of formula (7)

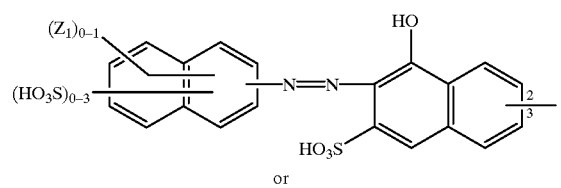
(7)

wherein

X₅ is fluorine or chlorine,

R₈ is hydrogen or C₁–C₄alkyl, and

G is a monoazo radical of formula (10a), (10b), (10d) or (10e)

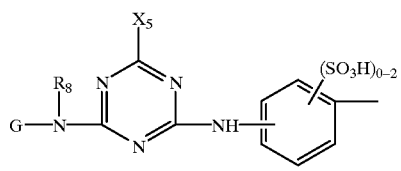
(10a)

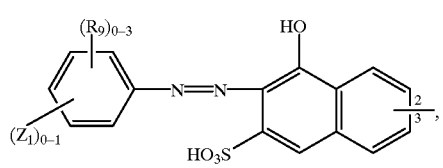
(10b)

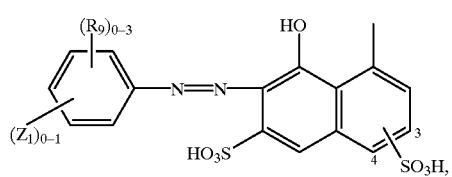
(10d)

or

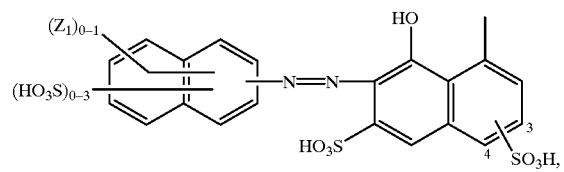
(10e)

wherein (R₉)₀₋₃ denotes from 0 to 3 identical or different substituents selected from the group C₁–C₄alkyl, C₁–C₄alkoxy, halogen, carboxy and sulfo, and Z₁, where present, is a radical of formula (2a), (5a), (5b), (5c), (5d) or (5e)

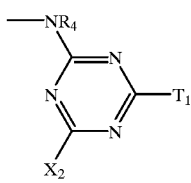
(5e)

wherein

R₄ is hydrogen,

Hal is bromine,

X₂ is chlorine or fluorine,

Y is vinyl, β-chloroethyl or β-sulfatoethyl,

T₁ is C₁–C₄alkoxy, C₁–C₄alkylthio, hydroxy, amino, N-mono- or N,N-di-C₁–C₄alkylamino unsubstituted or substituted in the alkyl moiety by hydroxy, sulfato or by sulfo, motpholino, or phenylamino or N—C₁–C₄alkyl-N-phenylamino (wherein the alkyl is unsubstituted or substituted by hydroxy, sulfo or by sulfato) each unsubstituted or substituted in the phenyl ring by sulfo, carboxy, acetylamino, chloro, methyl or by methoxy, or naphthylamino unsubstituted or substituted by from 1 to 3 sulfo groups, or is a fibre-reactive radical of formula (6c') or (6d')

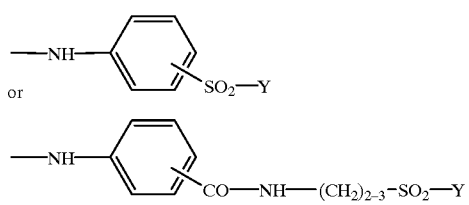

(6c′)

(6d′)

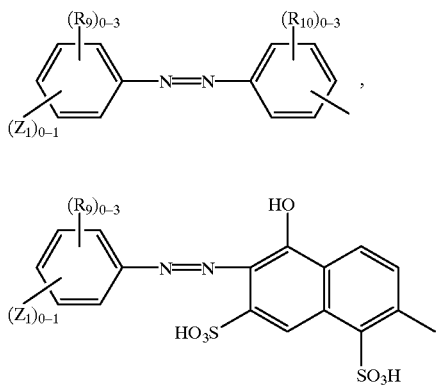

(10l)

(11b)

wherein Y is as defined above, k is the number 2 or 3, and l is the number 3 or 4;

or $D_1$ as the radical of an azo dye is a radical of formula (10a) or (10b) above, or of formula (10l), (11a), (11b) or (11f)

(11a)

(11f)

wherein $(R_9)_{0-3}$ and $Z_1$ are as defined above, and $(R_{10})_{0-3}$ denotes from 0 to 3 identical or different substituents selected from the group halogen, nitro, cyano, trifluoromethyl, sulfamoyl, carbamoyl, $C_1$–$C_4$alkyl, $C_1$–$C_4$alkoxy unsubstituted or substituted by hydroxy, sulfato or by $C_1$–$C_4$alkoxy, amino, $C_2$–$C_4$alkanoylamino, ureido, hydroxy, carboxy, sulfomethyl, $C_1$–$C_4$alkylsulfonylamino and sulfo.

4. A reactive dye according to claim 2, wherein $D_2$ is a radical of formula (15)

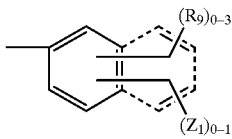

(15)

wherein $(R_9)_{0-3}$ denotes from 0 to 3 identical or different substituents selected from the group $C_1$–$C_4$alkyl, $C_1$–$C_4$alkoxy, halogen, carboxy and sulfo, and $Z_1$, where present, is a radical of formula (2a), (5a), (5b), (5c), (5d) or (5e)

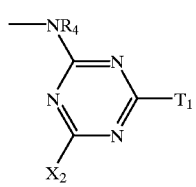
(5e)

wherein
$R_4$ is hydrogen,
Hal is bromine,
$X_2$ is chlorine or fluorine,
Y is vinyl, β-chloroethyl or β-sulfatoethyl, $T_1$ is $C_1$–$C_4$alkoxy, $C_1$–$C_4$alkylthio, hydroxy, amino, N-mono- or N,N-di-$C_1$–$C_4$alkylamino unsubstituted or substituted in the alkyl moiety by hydroxy, sulfato or by sulfo, morpholino, or phenylamino or N—$C_1$–$C_4$alkyl-N-phenylamino (wherein the alkyl is unsubstituted or substituted by hydroxy, suffo or by sulfato) each unsubstituted or substituted in the phenyl ring by sulfo, carboxy, acetylamino, chloro, methyl or by methoxy, or naphthylamino unsubstituted or substituted by from 1 to 3 sulfo groups, or is a fibre-reactive radical of formula (6c') or (6d')

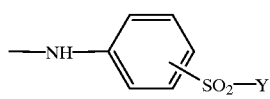
(6c')

or

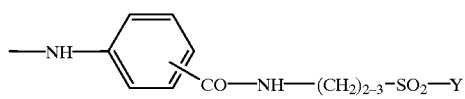
(6d')

and Y is as defined above,
k is the number 2 or 3 and
l is the number 3 or 4.
5. A reactive dye according to claim 2, wherein
$D_2$ is a radical of formula (15a), (15b), (15c), (15d) or (15e)

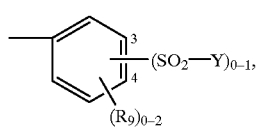
(15a)

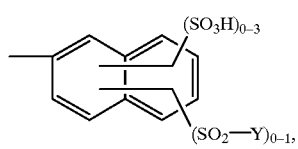
(15b)

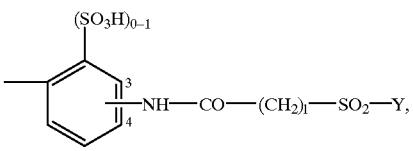
(15c)

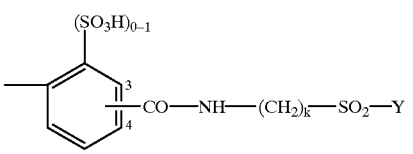
(15d)

or

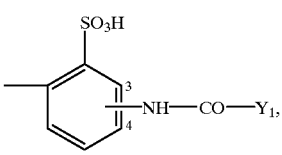
(15e)

wherein
$(R_9)_{0-2}$ denotes from 0 to 2 identical or different substituents selected from the group halogen, $C_1$–$C_4$alkyl, $C_1$–$C_4$alkoxy and sulfo,
$Y_1$ is a group —CH(Br)—$CH_2$—Br or —C(Br)=$CH_2$,
Y is vinyl, β-chloroethyl or β-sulfatoethyl,
k is the number 2 or 3, and
l is the number 3 or 4.

6. A process for dyeing or printing hydroxyl-group-containing or nitrogen-containing fibre materials, which comprises applying to said fibre materials a reactive dye according to claim 1.

7. A process according to claim 6, wherein said fibre material is cellulosic fibre material.

8. A process according to claim 6, wherein said fibre material is cotton.

9. A process for dyeing or printing hydroxyl-group-containing or nitrogen-containing fibre materials, which comprises applying to said fibre materials a reactive dye according to claim 2.

10. A process according to claim 9, wherein said fibre material is cellulosic fibre material.

11. A process according to claim 9, wherein said fibre material is cotton.

12. An aqueous ink comprising a reactive dye of formula (1a) according to claim 1.

13. A process for printing textile fibre materials, paper or plastics films in accordance with the inkjet printing method, which comprises applying to said materials an aqueous ink according to claim 12.

14. An aqueous ink comprising a reactive dye of formula (1b) according to claim 2.

15. A process for printing textile fibre materials, paper or plastics films in accordance with the ink-jet printing method, which comprises applying to said materials an aqueous ink according to claim 14.

* * * * *